(12) United States Patent
Diperna et al.

(10) Patent No.: US 10,171,184 B2
(45) Date of Patent: Jan. 1, 2019

(54) METHODOLOGY OF USING THE VARIOUS CAPABILITIES OF THE SMART BOX TO PERFORM TESTING OF OTHER FUNCTIONALITY OF THE SMART DEVICE

(71) Applicant: w2bi, Inc., South Plainfield, NJ (US)

(72) Inventors: Derek Diperna, Medford Lakes, NJ (US); Ira Leventhal, San Jose, CA (US); Keith Schaub, Austin, TX (US); Artun Kutchuk, San Jose, CA (US)

(73) Assignee: W2BI, INC., South Plainfield, NJ (US)

( * ) Notice: Subject to any disclaimer, the term of this patent is extended or adjusted under 35 U.S.C. 154(b) by 25 days.

(21) Appl. No.: 14/949,591

(22) Filed: Nov. 23, 2015

(65) Prior Publication Data

US 2016/0192213 A1 Jun. 30, 2016

Related U.S. Application Data

(60) Provisional application No. 62/088,319, filed on Dec. 5, 2014.

(51) Int. Cl.
*H04W 24/00* (2009.01)
*H04B 17/16* (2015.01)
(Continued)

(52) U.S. Cl.
CPC ............ *H04B 17/16* (2015.01); *B25J 9/1679* (2013.01); *G05B 19/41875* (2013.01); *G06F 3/0346* (2013.01); *G06F 11/2221* (2013.01); *H04B 17/11* (2015.01); *H04B 17/21* (2015.01); *H04B 17/29* (2015.01); *H04M 1/04* (2013.01); *H04N 7/18* (2013.01); *H04W 4/02* (2013.01); *H04W 4/80* (2018.02); *H04W 24/02* (2013.01); *G05B 2219/32368* (2013.01); *G05B 2219/37021* (2013.01); *G05B 2219/37022* (2013.01);
(Continued)

(58) Field of Classification Search
CPC ....... H04W 4/10; H04W 24/00–24/10; H04W 52/0251–52/0283; H04W 52/28; H04M 1/0214; H04M 1/6066; H04M 76/005; H01Q 1/243; H04B 1/385; H04B 1/3888
See application file for complete search history.

(56) References Cited

U.S. PATENT DOCUMENTS 3,082,374 A    3/1963 Buuck
6,522,995 B1   2/2003 Conti et al.
(Continued)

*Primary Examiner* — San Htun

(57) ABSTRACT

An automatic system level testing (ASLT) system for testing smart devices is disclosed. The system comprises a system controller coupled to a smart device in an enclosure, wherein the system controller comprises a memory comprising test logic and a processor. The enclosure comprises a plurality of components, wherein the processor is configured to automatically control the smart device and the plurality of components in accordance with the test logic. The plurality of components comprises: (a) a robotic arm comprising a stylus affixed thereto; and (b) a platform comprising a device holder affixed thereto, wherein the smart device is inserted into the device holder; and (c) a wireless access point. The processor is further configured to: (a) control the smart device to activate wireless mode; (b) receive wireless signals from the wireless access point using the smart device; (c) retrieve wireless scan results from the smart device; and (d) analyze the wireless scan results.

22 Claims, 39 Drawing Sheets

(51) Int. Cl.

| | | |
|---|---|---|
| *G05B 19/418* | (2006.01) | |
| *H04W 4/80* | (2018.01) | |
| *G06F 3/0346* | (2013.01) | |
| *H04M 1/04* | (2006.01) | |
| *H04N 7/18* | (2006.01) | |
| *H04W 4/02* | (2018.01) | |
| *H04W 24/02* | (2009.01) | |
| *G06F 11/22* | (2006.01) | |
| *H04B 17/11* | (2015.01) | |
| *H04B 17/21* | (2015.01) | |
| *H04B 17/29* | (2015.01) | |
| *B25J 9/16* | (2006.01) | |
| *H02J 7/02* | (2016.01) | |
| *H04M 1/24* | (2006.01) | |
| *H04W 84/12* | (2009.01) | |
| *H04W 24/06* | (2009.01) | |

(52) U.S. Cl.
CPC ........... *G05B 2219/37231* (2013.01); *G05B 2219/37388* (2013.01); *G05B 2219/37431* (2013.01); *G05B 2219/37433* (2013.01); *G05B 2219/37634* (2013.01); *G05B 2219/40041* (2013.01); *G05B 2219/45089* (2013.01); *H02J 7/025* (2013.01); *H04M 1/24* (2013.01); *H04W 24/06* (2013.01); *H04W 84/12* (2013.01)

(56) References Cited

U.S. PATENT DOCUMENTS

| | | | |
|---|---|---|---|
| 7,810,001 B2 | 10/2010 | Zhou et al. | |
| 8,054,221 B1 * | 11/2011 | Luong | G01S 19/23 |
| | | | 342/357.62 |
| 8,283,933 B2 | 10/2012 | Dasnurkar | |
| 8,310,385 B2 | 11/2012 | Dasnurkar | |
| 8,325,614 B2 | 12/2012 | Poon et al. | |
| 8,433,953 B1 | 4/2013 | Gaudette et al. | |
| 8,577,813 B2 | 11/2013 | Weiss | |
| 8,737,980 B2 | 5/2014 | Doshi et al. | |
| 8,856,539 B2 | 10/2014 | Weiss | |
| 8,983,394 B2 | 3/2015 | Deforge et al. | |
| 9,065,556 B2 | 6/2015 | Popescu et al. | |
| 9,100,826 B2 | 8/2015 | Weiss | |
| 9,116,873 B2 | 8/2015 | Majumdar et al. | |
| 9,185,675 B2 | 11/2015 | Chen et al. | |
| 9,253,242 B2 | 2/2016 | Macalet et al. | |
| 9,446,519 B2 | 9/2016 | Gray et al. | |
| 9,469,037 B2 | 10/2016 | Matthews et al. | |
| 9,481,084 B2 | 11/2016 | Park | |
| 9,530,137 B2 | 12/2016 | Weiss | |
| 9,544,910 B2 | 1/2017 | Delsol et al. | |
| 9,596,166 B2 | 3/2017 | Iyer et al. | |
| 9,652,077 B2 | 5/2017 | Jenkinson | |
| 10,025,883 B2 | 7/2018 | Paule et al. | |
| 2002/0116507 A1 | 8/2002 | Manjure et al. | |
| 2004/0012529 A1 | 1/2004 | Teshirogi et al. | |
| 2005/0083068 A1 | 4/2005 | Clarridge et al. | |
| 2007/0281684 A1 | 12/2007 | Parmar et al. | |
| 2008/0081608 A1 * | 4/2008 | Findikli | H04M 1/7253 |
| | | | 455/425 |
| 2008/0263410 A1 | 10/2008 | Mittal et al. | |
| 2008/0313313 A1 | 12/2008 | Doshi et al. | |
| 2009/0112505 A1 * | 4/2009 | Engel | G01D 21/00 |
| | | | 702/123 |
| 2009/0249284 A1 | 10/2009 | Antosz et al. | |
| 2009/0265035 A1 | 10/2009 | Jenkinson et al. | |
| 2009/0312009 A1 | 12/2009 | Fishel | |
| 2010/0113011 A1 * | 5/2010 | Gregg | H04W 24/06 |
| | | | 455/425 |
| 2010/0240317 A1 * | 9/2010 | Giles | H04B 17/29 |
| | | | 455/67.13 |
| 2011/0025337 A1 * | 2/2011 | Morrow | G01R 31/26 |
| | | | 324/414 |
| 2011/0151863 A1 | 6/2011 | Shaw et al. | |
| 2011/0178766 A1 * | 7/2011 | York | G01B 5/012 |
| | | | 702/154 |
| 2011/0293840 A1 | 12/2011 | Newkirk et al. | |
| 2012/0131515 A1 | 5/2012 | Rice | |
| 2012/0139571 A1 | 6/2012 | Nickel et al. | |
| 2012/0146956 A1 | 6/2012 | Jenkinson | |
| 2012/0280934 A1 | 11/2012 | Ha et al. | |
| 2012/0282891 A1 | 11/2012 | Mohammed et al. | |
| 2012/0300649 A1 | 11/2012 | Parmar et al. | |
| 2013/0078983 A1 | 3/2013 | Doshi et al. | |
| 2013/0183898 A1 * | 7/2013 | Strid | H04B 5/0037 |
| | | | 455/41.1 |
| 2013/0227348 A1 | 8/2013 | Stephenson et al. | |
| 2013/0294255 A1 | 11/2013 | Olgaard et al. | |
| 2013/0345864 A1 * | 12/2013 | Park | B25J 9/1612 |
| | | | 700/248 |
| 2014/0111484 A1 | 4/2014 | Welch et al. | |
| 2014/0122009 A1 | 5/2014 | Meiyappan | |
| 2014/0305224 A1 | 10/2014 | Zhang et al. | |
| 2014/0379935 A1 | 12/2014 | Venkatasubramaniam et al. | |
| 2014/0380281 A1 | 12/2014 | McLaughlin | |
| 2015/0003505 A1 | 1/2015 | Lusted et al. | |
| 2015/0297991 A1 | 10/2015 | Mahlmeister et al. | |
| 2016/0044520 A1 | 2/2016 | Iyer et al. | |
| 2016/0134737 A1 | 5/2016 | Pulletikurty | |
| 2016/0187876 A1 | 6/2016 | Diperna et al. | |
| 2016/0187877 A1 | 6/2016 | Diperna et al. | |
| 2018/0048555 A1 | 2/2018 | Doshi et al. | |
| 2018/0049050 A1 | 2/2018 | Doshi et al. | |
| 2018/0049051 A1 | 2/2018 | Doshi et al. | |
| 2018/0049052 A1 | 2/2018 | Doshi et al. | |
| 2018/0049054 A1 | 2/2018 | Doshi et al. | |
| 2018/0316443 A1 | 11/2018 | Diperna et al. | |

\* cited by examiner

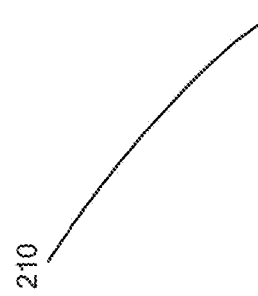
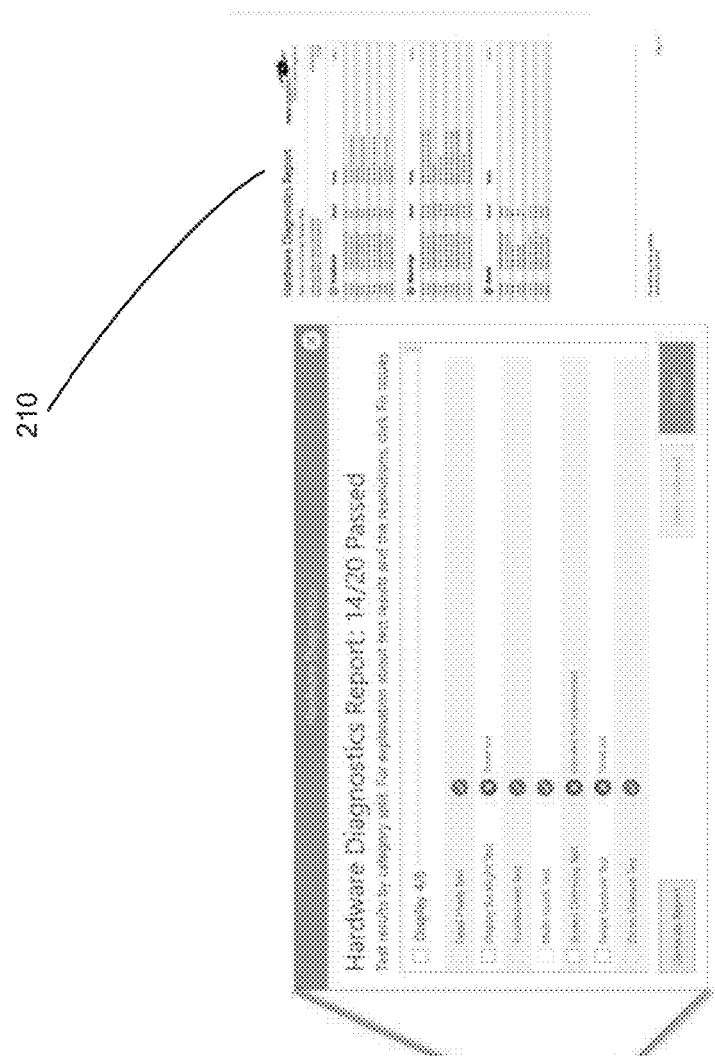
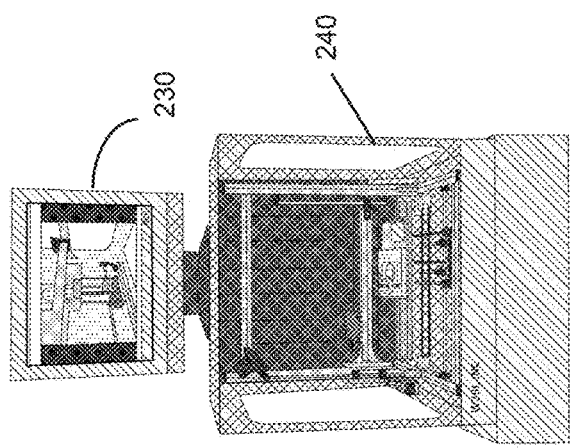
FIG. 2A
FIG. 2B

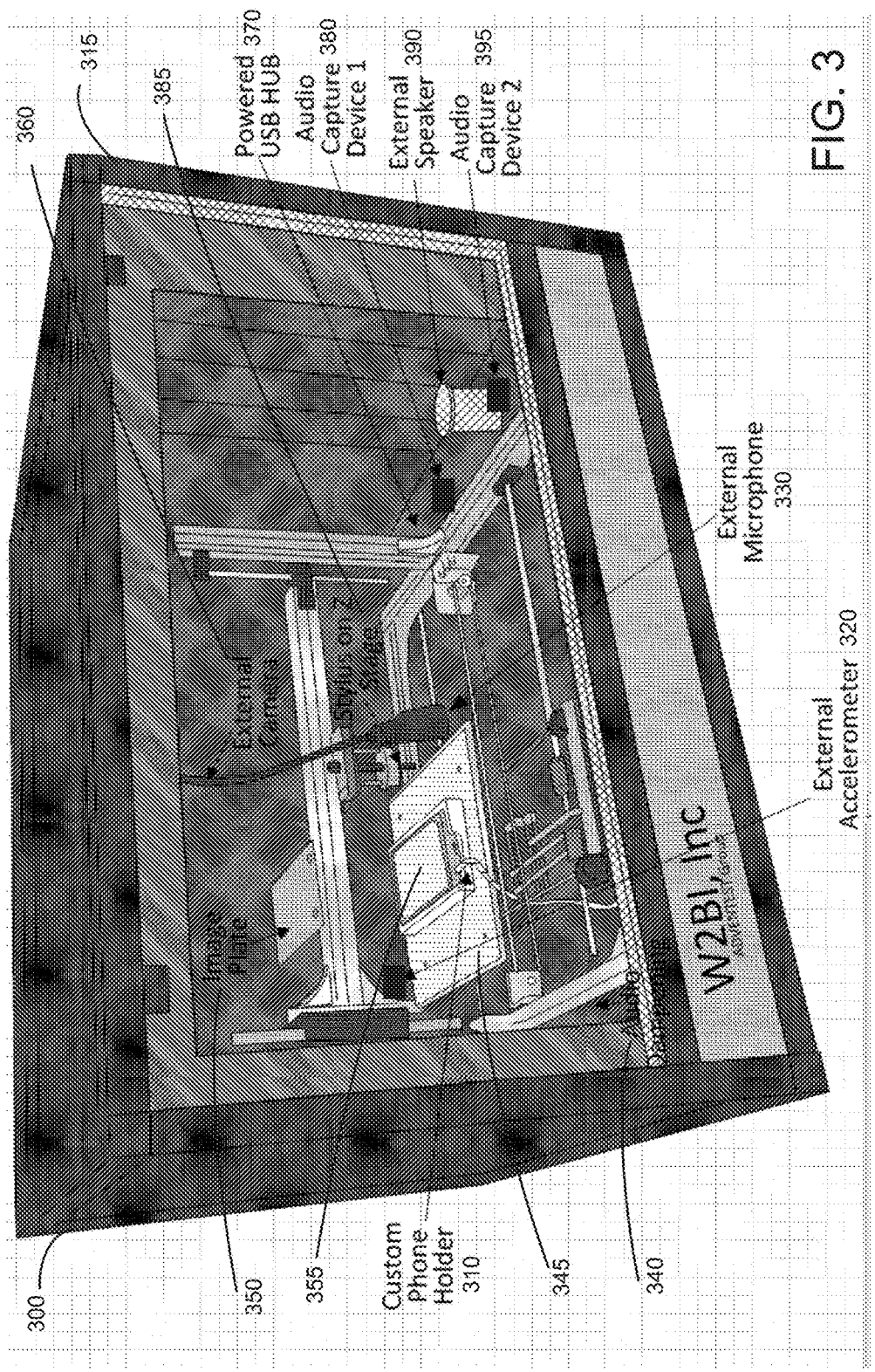

SmartBox Execution Steps
Simple Point of Sale Agent Experience
1. Place smart device into Smartbox
2. Select desired functional tests
3. Fully Automated tests executed with conclusive and actionable results
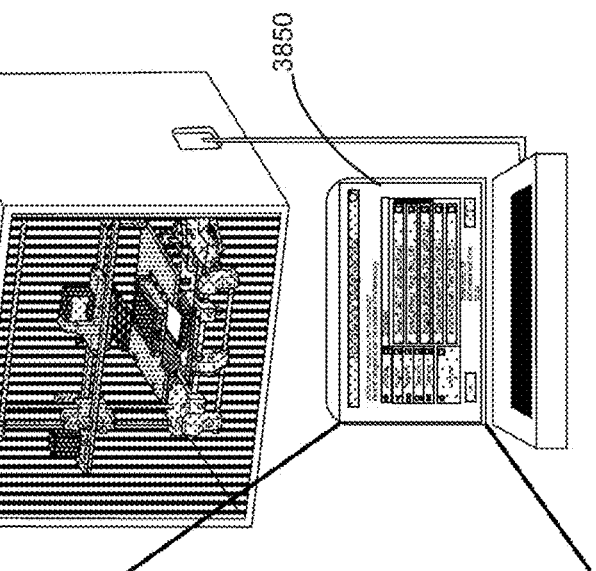
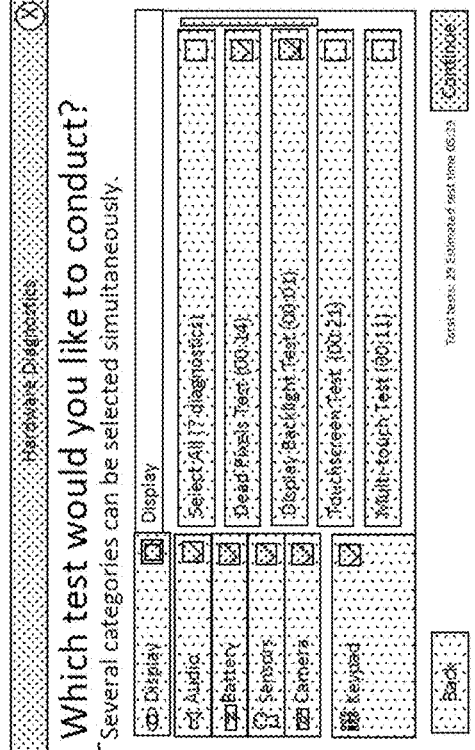
FIG. 38

METHODOLOGY OF USING THE VARIOUS CAPABILITIES OF THE SMART BOX TO PERFORM TESTING OF OTHER FUNCTIONALITY OF THE SMART DEVICE

CROSS-REFERENCE TO RELATED PATENTS AND APPLICATIONS

This application claims priority from U.S. Provisional Application No. 62/088,319, filed Dec. 5, 2014, the entire disclosure of which is incorporated herein by reference.

The present application is related to U.S. Pat. No. 8,737,980, filed Sep. 27, 2012, entitled "End to end Application Automatic Testing," naming Dinesh Doshi, Artun Kutchuk, Deepa Jagannatha, and Ramesh Parmar as inventors. This patent is incorporated herein by reference in its entirety and for all purposes.

The present application is related to U.S. patent application Ser. No. 14/949,526, filed Nov. 23, 2015, entitled "SMART BOX FOR AUTOMATIC FEATURE TESTING OF SMART PHONES AND OTHER DEVICES," naming Derek Dipterans, Ira Eventual, Keith Scab and Raton Ketchup as inventors. That application is incorporated herein by reference in its entirety and for all purposes.

The present application is also related to U.S. patent application Ser. No. 14/949,551, filed Nov. 23, 2015, entitled "SMART BOX FOR AUTOMATIC FEATURE TESTING OF SMART PHONES AND OTHER DEVICES," naming Derek Dipterans, Ira Eventual, Keith Scab and Raton Ketchup as inventors. That application is incorporated herein by reference in its entirety and for all purposes.

The present application is further related to U.S. patent application Ser. No. 14/949,576, filed Nov. 23, 2015, entitled "SMART BOX FOR AUTOMATIC FEATURE TESTING OF SMART PHONES AND OTHER DEVICES," naming Derek Dipterans, Ira Eventual, Keith Scab and Raton Ketchup as inventors. That application is incorporated herein by reference in its entirety and for all purposes.

FIELD OF THE INVENTION

The present disclosure relates generally to the field of electronic device testing systems and more specifically to the field of electronic device testing equipment for testing smart phones and tablets.

BACKGROUND OF THE INVENTION

Automatic system level testing (ASLT) can be any testing assembly that performs a test on a semiconductor wafer or die, or a device such as a solid-state drive or a smart phone. ASLT assemblies may be used to execute automated tests that quickly perform measurements and generate test results that can then be analyzed. An ASLT assembly may be anything from a computer system coupled to a meter, to a complicated automated test assembly that may include a custom, dedicated computer control system and many different test instruments that are capable of automatically testing electronics parts, semiconductor wafer testing (such as system-on-chip (SOC) testing) or testing devices such as smart phones. ASLT systems both reduce the amount of time spent on testing devices to ensure that the device functions as designed and serve as a diagnostic tool to determine the presence of faulty components within a given device before it reaches the consumer.

ASLT systems to test smart phones, for example, are required at both the point of sale and at the production facilities. Currently, if a user experiences a problem with their phone and brings it into a retail facility, there are no systems in place to exhaustively test the hardware and software on the phone to determine the source of the problem with a high degree of accuracy. Some retail facilities have the capability of performing some basic software testing of the phone, however, no retail facility has the ability to perform a complete hardware and software test on the phone and to test all the functions on the phone automatically. Accordingly, the phone either needs to be returned and replaced, which over time can result in substantial costs to the manufacturer. Alternatively, if the phone cannot be returned or replaced for any reason, the customer ends up dissatisfied if the problems with the phone are not easily diagnosed and fixed.

In some cases, the problem with the phone cannot be diagnosed at the retail facility. This is referred to as a No Trouble Found (NTF) or No Fault Found (NFF) condition. In such cases, the phone is sent to a repair center where a battery of tests are performed to determine if there is any issue. Currently, even the repair centers do not have a satisfactory solution to automatically test all the hardware and software functions on a smart phone.

While some software testing methodologies are in place, typically, a person has to manually test many of the device's hardware and software functions to ensure that the device is working adequately. Further, even if the device is repaired, there is no traceability for the repair work performed or any fully automated method for verifying that the repair work was performed satisfactorily. A person has to manually test the device to ensure that the device is working properly. Accordingly, the repair and test methodologies currently in place are subjective and not foolproof. Any errors in the repair or verification process will cost the manufacturers more money and result in customer dissatisfaction. Further, sending the phone to a repair center will almost always leave a customer dissatisfied as most customers cannot afford to be without their smart device for an extended period of time.

Additionally, the production facilities at which the phones are manufactured also do not currently have any mechanisms in place for complete hardware and software automated testing of the phone devices. Most of the functional testing that takes place before the phones are packaged is manual and, accordingly, it is error-prone and expensive. Further, the cost and susceptibility to error of the manual test processes currently in place is increasing as the feature-set on the devices increases.

BRIEF SUMMARY OF THE INVENTION

Accordingly, a need exists for an automated tester system that can address the problem of testing phones, e.g., smart phones at retail facilities, repair centers, and production facilities. What is needed is an automated tester system that can automatically perform a wide range of hardware and software functional tests on a smart phone.

Embodiments of the present invention provide a tester system (hereinafter referred to as the "Smart Box") that allows a user to perform a series of hardware and software tests in a closed and controlled environment, thus eliminating subjectivity of manual testing. Embodiments of the present invention are also optimized for speed and configured to test the major features of the phone in a short duration of time. Further, embodiments of the present invention transmit all test data to a centralized server enabling mobile operators to track feature issues, model issues, geographic and/or store issues. Accordingly, embodiments of the present invention are enabled for global analytics.

In one embodiment, the Smart Box is a box-shaped apparatus comprising robotics that allows the smart device to be moved in the x, y and z directions. Further, the apparatus comprises a stylus that can also move in the x, y and z directions and be used to actuate buttons on the smart device. In one embodiment of the present invention the smart device moves in the x and y direction while the stylus moves in the z direction. Accordingly, embodiments of the present invention are configured to allow the stylus and mobile device the mobility so that the stylus can make contact with the device at any location on the device to interface therewith.

In one embodiment, a user can place the smart device inside the Smart Box and use a computer connected to the Smart Box to select one or more tests to be applied to the device. The test software on the computer interacts with Smart Box to engage the smart device under test and the robotics of the Smart Box to exercise the various functions of the smart device. Each test is performed and compared against pass/fail criteria. A pass/fail determination is made and the following test is performed. In one embodiment, reports are automatically generated reporting the results of the various tests and sent to the cloud server.

In one embodiment, an automatic system level testing (ASLT) system for testing smart devices is disclosed. The system comprises a system controller operable to be coupled to a smart device, wherein the system controller comprises a memory comprising test logic and a processor and an enclosure comprising a plurality of components. The plurality of components comprise: (a) a robotic arm comprising a stylus; (b) a platform comprising a device holder, wherein the device holder is operable to hold the smart device inserted therein; and (c) a wireless access point. The processor is configured to automatically control the smart device and the plurality of components in accordance with the test logic, and wherein the processor is further configured to: (a) control the smart device to activate a wireless mode therein; (b) receive wireless signals from the wireless access point using the smart device; (c) retrieve wireless scan results from the smart device; and (d) analyze the wireless scan results to determine wireless functionality for the smart device.

In one embodiment, an automatic system level testing (ASLT) system for testing smart devices is disclosed. The system comprises a system controller operable to be coupled to a smart device, wherein the system controller comprises a memory comprising test logic and a processor, and further the system comprises an enclosure comprising a plurality of components, wherein the plurality of components comprise: (a) a robotic arm comprising a stylus attached thereo, wherein the stylus is operable to manipulate the smart device to simulate human interaction therewith; and (b) a platform comprising a device holder attached thereo, wherein the device holder is operable to hold the smart device inserted therein, wherein the platform is operable to rotate in a x-z plane and a y-z plane. The processor is configured to automatically control the smart device and the plurality of components in accordance with the test logic, and further wherein the processor is configured to: (a) retrieve metadata from a plurality of sensors on said smart device; and (b) transmit the metadata to the system controller.

In one embodiment, an automatic system level testing (ASLT) system for testing smart devices is disclosed. The system comprises: (a) a system controller coupled to a smart device, wherein the system controller comprises a memory comprising test logic and a processor; (b) an enclosure comprising a plurality of components, the plurality of components comprising: (i) a robotic arm comprising a stylus attached thereto; (ii) a platform comprising a device holder attached thereto, wherein the device holder is operable to hold the smart device; and (iii) an external programmable LED. The processor is configured to automatically control the smart device and the plurality of components in accordance with the test logic, and wherein the processor is further configured to: (a) control the smart device to activate an auto-brightness mode; (b) control the external programmable LED to turn to full brightness mode; and (c) analyze light intensity metadata from the smart device responsive to the brightness mode.

In one embodiment, an automatic system level testing (ASLT) system for testing smart devices is disclosed. The system comprises a system controller operable to be coupled to a smart device, wherein the system controller comprises a memory comprising test logic and a processor and the system further comprises an enclosure comprising a plurality of components, wherein the plurality of components comprise: (a) a robotic arm comprising a stylus affixed thereto; and (b) a platform comprising a device holder affixed thereto, wherein the device holder is operable to hold the smart device. The processor is configured to automatically control the smart device and the plurality of components in accordance with the test logic, and wherein the processor is further configured to: (a) control the smart device to activate GPS mode; (b) receiving GPS and location results from the smart device; and (c) analyzing the GPS and location results received from the smart device to determine GPS functionality for the smart device.

In one embodiment, a method of testing a smart device in a testing system is presented. The method comprises registering a model of a smart device inserted into the testing system, wherein the testing system comprises: (a) a system controller operable to be coupled with the smart device, wherein the system controller comprises a memory comprising test logic and a processor; and (b) an enclosure, wherein the enclosure comprises a plurality of components, the plurality of components comprising: (i) a robotic arm comprising a stylus, wherein the stylus is operable to manipulate the smart device to simulate human interaction therewith; and (ii) a platform comprising a device holder, wherein the device holder is operable to receive a smart device inserted there into. The method further comprises: (a) controlling the smart device and the plurality of components in accordance with the test logic; (b) controlling the smart device to activate a GPS mode; (c) receiving GPS and location results from the smart device; and (d) analyzing the GPS and location results received from the smart device to determine GPS functionality for the smart device.

The following detailed description together with the accompanying drawings will provide a better understanding of the nature and advantages of the present invention.

BRIEF DESCRIPTION OF THE DRAWINGS

FIG. 2A illustrates a typical test set up with a system controller and a Smart Box in accordance with an embodiment of the present invention.

FIG. 2B illustrates the manner in which auto-generated diagnostic reports are generated by the test software in accordance with an embodiment of the present invention.

FIG. 3 illustrates the components of a Smart Box in accordance with an embodiment of the present invention.

FIG. 38 illustrates the manner in which the Smart Box facilitates device diagnostics at a point of sale in accordance with an embodiment of the present invention.

Figure 1:
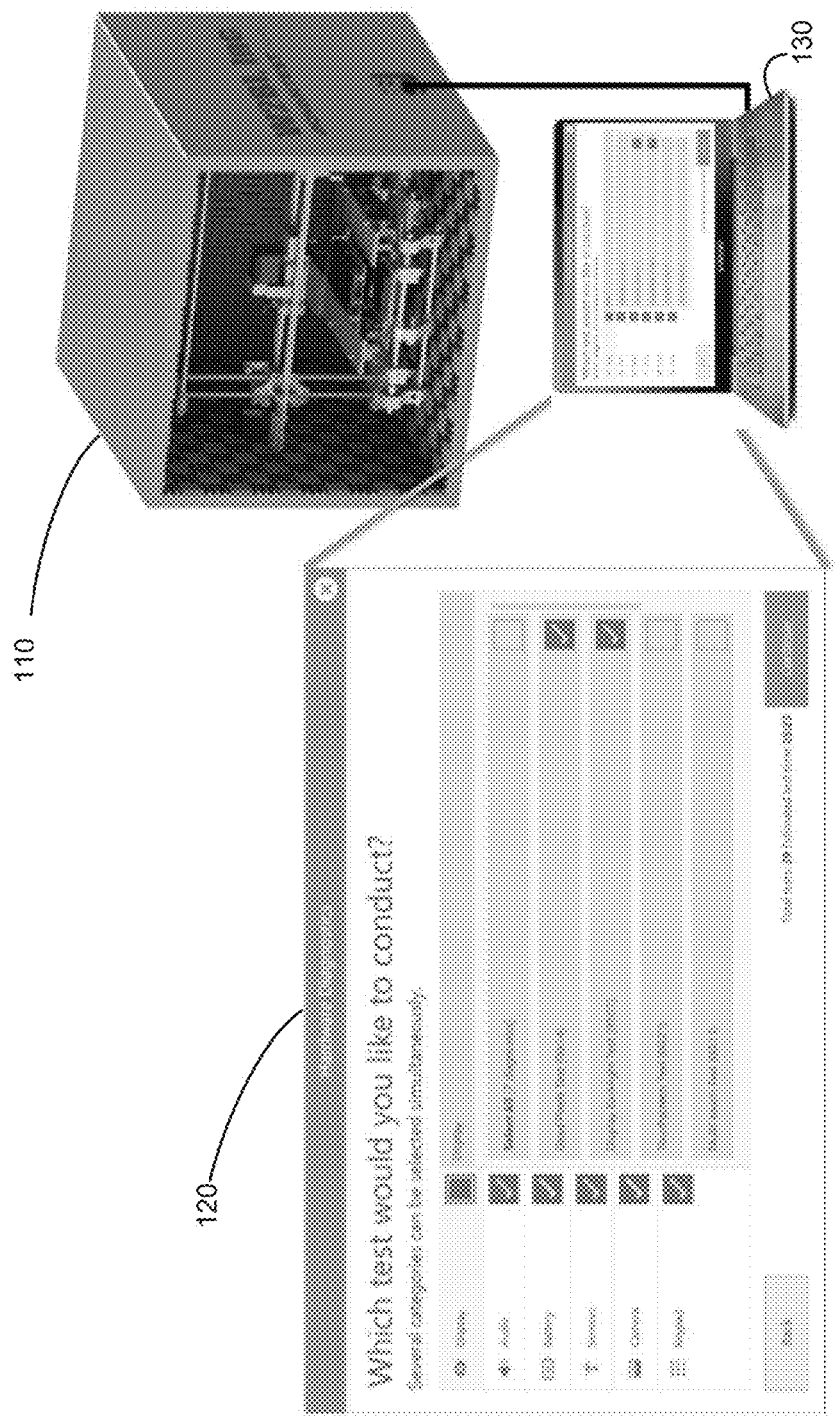
FIG. 1 illustrates a typical test configuration for using the Smart Box to test smart devices in accordance with an embodiment of the present invention.

In the figures, elements having the same designation have the same or similar function.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Notation and Nomenclature Section

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "analyzing," "reading," "receiving," "controlling," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

The Methodology of Using the Various Capabilities of the Smart Box to Perform Testing of Other Functionality of the Smart Device Embodiments of the present invention provide a tester system (hereinafter referred to as the "Smart Box") that allows a user to perform a series of hardware and software tests in a closed and controlled environment, thus eliminating subjectivity of human testing. Embodiments of the present invention can be optimized for speed configured to test the major features of the phone (or tablet) in a short duration of time. Further, embodiments of the present invention transmit all test data to a centralized server enabling mobile operators to track feature issues, model issues, geographic and/or store issues. Accordingly, embodiments of the present invention are enabled for global analytics.

In one embodiment, the Smart Box is a box-shaped apparatus comprising a robotic arm that allows the smart device to be moved in the x, y and z directions. Further, the apparatus comprises a stylus attached to the robotic arm that can also move in the x, y and z directions and be used to actuate buttons on the smart device. In one embodiment of the present invention the smart device moves in the x and y direction while the stylus moves in the z direction. Accordingly, embodiments of the present invention are configured to allow the stylus and mobile device the mobility so that the stylus can make contact with the device at any location on the device.

In one embodiment, a user can place the smart device inside the Smart Box and use a computer connected to the Smart Box to select one or more tests to be applied to the device. The test software on the computer interacts with Smart Box to engage the smart device under test and the robotics of the Smart Box to exercise the various functions of the smart device. Each test is performed and compared against pass/fail criteria. A pass/fail determination is made and the subsequent test is performed. In one embodiment, reports are automatically generated reporting the results of the various tests and sent to the cloud server.

Embodiments of the present invention are advantageous because they help reduce No Trouble Found (NTF)/No Fault Found (NFF) occurrences at both point of sale, repair center and production facilities by executing simple automated functional and specification tests on devices. Embodiments of the present invention leverage digital and physical robotics automation to test for problem scenarios in a controlled environment. Further, embodiments of the present invention implement test automation platforms to orchestrate problem scenarios, thereby leveraging the Smart Box's robotic test enclosure combined with robust test emulators. The Smart Box platform further targets a low-cost scalable profile with a simple and easy to use experience targeted at point of sale and repair center end users.

Embodiments of the present invention also help to isolate quality issues and classify true failures. By automating the testing process, human subjectivity is eliminated, thereby, standardizing the test process. Further, embodiments of the present invention provide a mechanism to verify and validate repairs, thereby, ensuring consistency and accuracy. Accordingly, the cost to manufacturers is decreased, device returns are decreased and customer satisfaction is increased. Further, embodiments of the present invention capture end-user experience metrics allowing performance to be tracked over time.

Devices that have no detectable faults can readily be determined using the Smart Box technology thereby avoiding costly repair/diagnostic outsourcing. Also, if a device is faulty, the fault or defect can efficiently and automatically be determined using the Smart Box technology versus time consuming and error prone manual testing techniques. Also, intermittent faults can more accurately be detected. By removing manual testing steps, device testing can be made more efficient, more effective and more reproducible. Also, test results over many devices can more easily be compiled for archiving and analysis purposes.

FIG. 1 illustrates a typical test configuration for using the Smart Box to test smart devices in accordance with an embodiment of the present invention. As mentioned above, an end user (at a point of sale or repair center) can place a smart device into the Smart Box 110. The end user can then select the desired functional tests as shown in user interface 120 displayed on a computer 130. Computer 130 can be any of various types of computing devices, e.g., a laptop device, a workstation, a desktop computer, a smart phone, a tablet device, etc. running the test automation software required to control the Smart Box 110.

The test automation software running on computer 130 can be, for example, the QUIKSTRESS™ testing platform for lab and live testing which, among other things, allows testers of smart devices to easily record macros and have them play-back across different models and manufacturers. As will be explained below, the test automation software, e.g., QUIKSTRESS, etc. can be designed to identify and troubleshoot customer-experience issues at the point of sale, and to reduce the No Fault Found (NFF) devices at the repair centers to save costs for both OEMs and operators.

In one embodiment, when an end user connects to the Smart Box 110 using computer system 130 after placing the device to be tested in the Smart Box 110, user interface 120 will begin to guide the user through a series of options for conducting the requisite tests. In one embodiment, the various tests can be grouped into different categories, e.g., tests associated with the display, the audio, the battery, sensors, camera, and keypad, etc. as shown in user interface 120. Other exemplary categories may also test the touch screen, physical buttons, gyro and accelerometer.

The user can select either one or all of the tests to execute within a certain category. Alternatively, the user can select all the tests within all categories to execute at the same time. The test automation software running on computer 130 will determine the tests that can be executed simultaneously versus the tests that are to be executed serially. Upon user selection, the tests will then execute and provide conclusive and actionable results.

FIG. 2A illustrates a typical test set up with a system controller and a Smart Box in accordance with an embodiment of the present invention. As shown in FIG. 2A, the system controller (e.g. computer terminal 130 in FIG. 1) runs test automation software that controls the various tests run on the smart devices by Smart Box 230. Before testing, however, the system controller will need to control the smart device to operate it in debug mode.

Embodiments of the present invention allow information to be communicated from the smart device and components within Smart Box 240 to system controller 240 while the smart device is being tested and for commands to flow from the system controller back to the smart device. For example, the smart device being tested may be used to take a picture of a physical reference image and the information could be communicated to system controller 230 to determine if it matches the reference image stored in memory to determine if the camera on the smart device is functioning properly. Embodiments of the present invention are, therefore, capable of manipulating the smart device both physically and through software, and are also able to collect diagnostic information in real-time using the system controller to determine if the smart device is functioning normally.

FIG. 2B illustrates the manner in which auto-generated diagnostic reports are generated by the test software in accordance with an embodiment of the present invention. After the user has executed the tests on the smart device, the test automation software running on computer 130 can auto-generate reports 210 with the test results. The reports 210 can include pass/fail information regarding the various tests and other information relevant to the testing of the various features of the smart device. These results can then be uploaded to the cloud. In this way, embodiments of the present invention provide fully traceable global analytics.

FIG. 3 illustrates the components of a Smart Box in accordance with an embodiment of the present invention. Unlike prior art systems for testing smart devices, the Smart Box allows a user to combine a) physical manipulation of the phone using a robotic arm; b) automated control of the phone through USB or Wi-Fi (or any other applicable communication protocol, e.g., FireWire); and c) automated tester software integration with the Smart Box that allows the user to stress the phone using downloadable test packages and generate custom test scenarios.

In one embodiment, the physical features/instrumentation of the Smart Box include the enclosure 315, the robotic elements, the sensors and instruments, the plate that holds the smart device DUT and the electronics to interface with and drive testing of the DUT. This case includes the robotic mechanisms for holding and automatically moving the DUT and for automatically physically interfacing with the touch screen and other physical buttons of the DUT to simulate human interaction therewith.

As will be explained in further detail below, this case includes the various Smart Box sensors that detect output from the DUT such as a camera, a microphone, a flash detector, wireless signal detectors, interfaces to read the contents of the DUT memory, and interfaces to pick up signals from the audio jack, etc. The case also includes the various instruments that can stimulate the DUT, such as a speaker, a wireless signal broadcaster, external speaker, motion devices on the plate that holds the DUT, a robotic stylus, a USB charger interconnect, a wireless charger device, etc. This case also includes the logic, that can be integrated with the Smart Box, or external thereto, for performing the actual testing and automated control of the physical elements/robotic elements/instruments of the Smart Box, e.g., using the QUIKSTRESS software.

In one embodiment, the Smart Box 300 comprises an image plate 350. The image plate comprises a physical reference image that is fixed inside of the Smart Box and can be used to test the front and rear camera functionality of the smart device. In one embodiment, the physical reference image can comprise a color chart. In one embodiment, a separate image plate can be used for each of the front and rear cameras. Reference images identical to the physical reference image 350 can be stored in an image library within the automated tester software running on terminal 130.

The smart device 355 and the Smart Box 300 can be controlled via an appropriate communication protocol (e.g., USB, Wi-Fi etc.) using the tester software running on terminal 130. The software launches and controls the camera application on smart device 355. The software also controls the smart device 355 and the robotics (e.g. stylus 385, smart plate or platform 345) to move and position the smart device 355 in an appropriate location relative to the image plate 350. The software also activates the camera on the smart device to capture an image (using either the front or the back camera or both simultaneously if the Smart Box is equipped with multiple image plates). The software can also be configured to retrieve the image from the smart device camera and compare the retrieved image with the reference image stored on terminal 130 to determine if the camera passes or fails the test. In one embodiment, the comparison threshold for determining a pass or fail is user configurable.

In one embodiment, Smart Box 300 comprises a custom phone holder 310. The custom phone holder is customizable and can be customized for all the different models of smart devices. Because each smart device has a different form factor, a customizable phone holder is required to accommodate the various form factors. In order to test a different smart device (e.g., switching from testing an iPhone to a Samsung phone), the custom phone holder 310 in Smart Box 300 would need to be swapped out. In one embodiment, the custom phone holder 310 may be affixed to the plate or platform 345 using one of several means (e.g., clamps, screws, dowels, etc.)

In a different embodiment, the smart plate 345 and custom holder 310 are designed and manufactured as a single unit with each model of smart device requiring a different plate unit. Accordingly, in one embodiment, the entire plate 345 is swapped out in order to test a different model phone. In one embodiment, the Smart Box can comprise a robotic arm that can automatically swap out a smart plate if a user sends a command from terminal 130 to test a different model phone.

In one embodiment, the plate 345 is configured to move in the x-y direction while the stylus 385 (and the robotic arm attached thereto) moves in the z direction. Also the smart plate 345 can be configured to rotate so as to alternate the phone 355 between a portrait and landscape orientation. In one embodiment, the smart plate 345 may also be configured to tilt in the theta-x and theta-y directions as well.

In one embodiment, Smart Box 300 comprises a stylus 385. The stylus 385 can be a capacitive stylus with a soft tip similar to those used by hand on touch-screen devices as an alternative to finger touch. The stylus 385 can be controlled by the robotics within Smart Box 300. For example, the stylus 385 can be attached to a robotic arm that allows movement in the z plane. As mentioned previously, the Smart Box 300 has a mechanism to allow at least three-dimensional movement of the smart device under test and sensors relative to each other. In one embodiment, the smart device is placed a stage (or smart plate 345) that can move in the X-Y dimensions while the stylus 385 and other sensors are mounted on an arm moving in the Z dimension. In a different embodiment, the robotic arm and the stylus attached thereto can move in all three x, y and z planes.

In one embodiment, Smart Box comprises an external camera 360. It should be noted that in different embodiments, the Smart Box can also comprise multiple cameras. External camera 360 can be a high resolution camera operable to take high resolution pictures of any sized smart device. The camera 360 can be mounted in a fixed position within the Smart Box and is connected to and controlled by the tester software on terminal 130. The camera 360 can be used to take pictures of the DUT display during one of the several tests using the camera, e.g., a touch-screen test implementation. Alternatively, the camera 360 can be used to take pictures of calibration-related images as part of a robotic calibration process run by the Smart Box and test automation software. In a different embodiment, the camera 360 can move in the z direction and be adjusted to accommodate different sized smart device screens.

In one embodiment, the Smart Box 300 comprises two audio capture devices 370 and 395, an external microphone 330, an audio dampening module 340, and an external speaker 390 that are used to test the various audio features of the smart device. In different embodiments, either more or less audio capture devices or speakers may be available. The audio capture devices 370 and 395, in one embodiment, may be connected to the tester automation software through a USB or Wi-Fi connection (or any other appropriate protocol). The audio capture devices may be able to both source and capture high quality stereo audio. Sourcing can be done through a 3.5 mm stereo output, while capture is done through a 3.5 mm stereo input or ¼" microphone input for instance. The audio capture devices can be used, for example, to test the speaker phone capability on the smart device and to test the sound quality through the microphone jack on the smart device.

In one embodiment, the speaker 390 and microphone 330 connect to the audio capture devices and are positioned in a relatively close position to the speakers and microphones on the smart device. The speakers and microphone are used to test the receiver and headset/microphone jack on the smart device respectively. In one embodiment, the Smart Box also comprises a 3.5 mm audio signal splitter to split the headphone and microphone inputs. The splitter splits a 4-connector plug that is plugged into the jack on the smart device into a 3-connector jack for stereo device output and a 2-connector jack for mono device input.

In one embodiment, the automation test software integrates mobile voice quality testing modules. For example, the test software can integrate POLQA, a software library includes perceptual measurement software that calculates audio quality by comparing a degraded file to a reference file. POLQA is standardized by the International Telecommunication Union (ITU-T) and using the POLQA library allows the test automation software to determine the quality of the audio files received from the smart device in accordance with an industry standard.

In one embodiment, the Smart Box can also include an audio dampening module 340 to mitigate any noise issues and provide audio insulation for the Smart Box enclosure 315. In most embodiments, the enclosure encloses the Smart Box on all sides in order to minimize noise. The front door, however, can be removable as shown in FIG. 3.

In one embodiment, the Smart Box 300 also comprises an external accelerometer 320. The accelerometer can be mounted on the smart plate 345 and connected to the system controller (e.g., automation software running on terminal 130) to be used for monitoring vibrations.

In one embodiment, the Smart Box comprises an external programmable light source (not shown in FIG. 3). The light source can, for example, be used for testing the phone's light sensor. In one embodiment, the light source can be an LED light strip with an intensity, color, and illumination level controlled by the system controller 130. In one embodiment, the light source can be external programmable LEDs used to test the auto brightness feature of the smart device.

In one embodiment, the Smart Box can also comprise an external light sensor or meter (not shown in FIG. 3) to measure light intensity from the smart device (e.g., flash and display light intensity). The light meter can be connected to the system controller 130 and will be mounted within the Smart Box enclosure.

In one embodiment, the Smart Box may include a capacitive object (not shown in FIG. 3) to test the proximity sensor for the smart device. In one embodiment, the capacitive object can be part of the stylus 385. The robotics within the Smart Box 300 may vertically orient the phone and a capacitive object is moved close to the smart device to activate the sensor on the smart device. If the sensor moves close to the screen of the smart device, the smart device screen deactivates and if it moves away from the sensor, the screen reactivates. This simulates the display of a device deactivating in response to a user holding up the smart device to his ear in order to conserve power.

In one embodiment, the Smart Box may also include a fingerprint device (not shown in FIG. 3) to test the fingerprint functionality of the smart device. Further, in one embodiment, the Smart box can also comprise a Bluetooth device (not shown in FIG. 3) to test the Bluetooth functionality of the smart device.

In one embodiment, Smart Box 300 can also comprise a powered USB hub 370. The USB hub 370 can provide power to the various components of the Smart Box, e.g., microphone, audio capture devices, etc. However, the present invention is not limited to simply USB powered devices but also encompasses other methods of providing power and communicating with the various components of the Smart Box.

Figure 4:
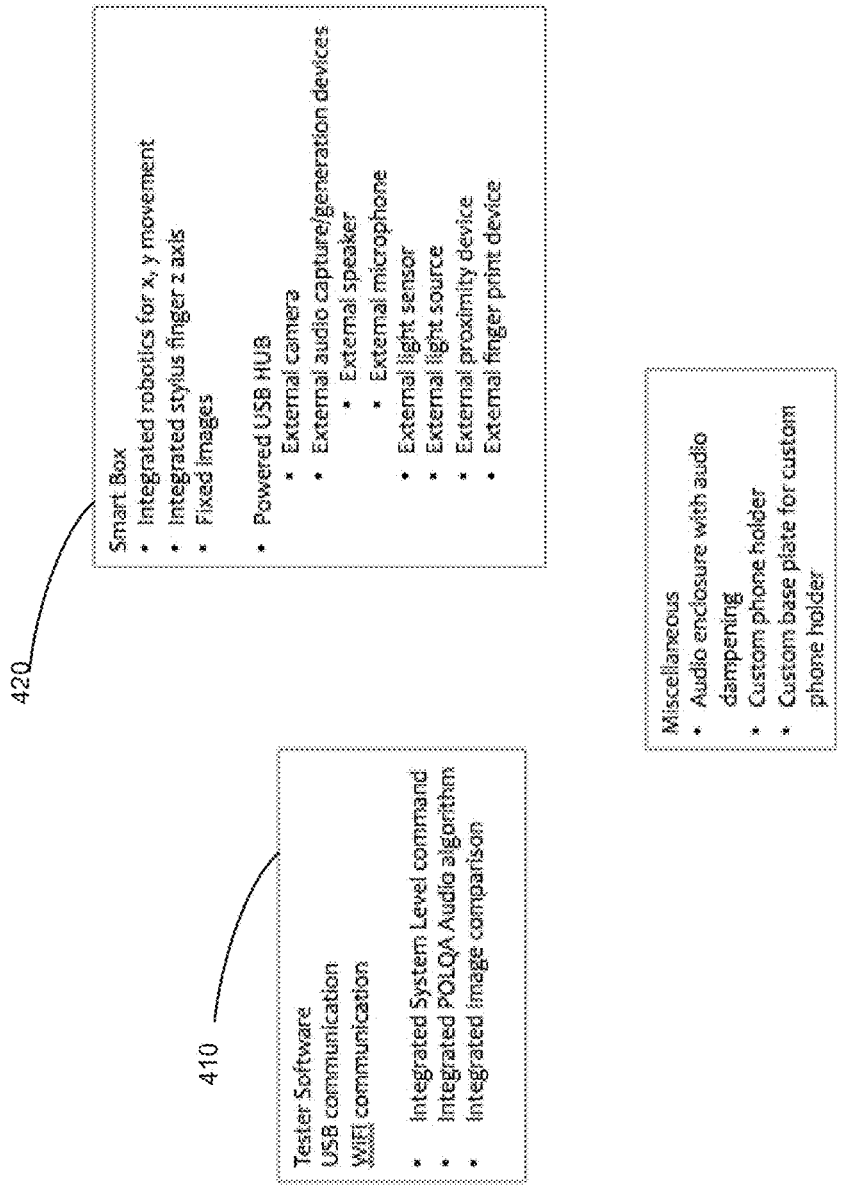
FIG. 4 is a functional block diagram illustrating some exemplary components of the Smart Box tester system in accordance with an embodiment of the present invention.

FIG. 4 is a functional block diagram illustrating some exemplary components of the Smart Box tester system in accordance with an embodiment of the present invention. As discussed above, the Smart Box tester system comprises a system controller 130, wherein the system controller 130 has test automation software 410 compatible with the Smart Box tester installed on it. The tester software 410 can communicate with the Smart Box using either USB communication or Wi-Fi communication as shown in FIG. 4. In different embodiments, other communication protocols may also be used. Among other features, the tester software can comprise integrated system level commands, integrated POLQA audio algorithm (as discussed previously), and integrated image comparison.

The Smart Box 420 comprises integrated robotics for x and y direction movements of the smart plate 345. It also includes integrated stylus finger 385 that can move in the z direction. The Smart Box may also comprise fixed reference images, e.g., images on image plate 350.

The Smart Box can also comprise a powered USB that is used to power an external camera, external audio capture and generator devices (e.g., speakers and microphones), external light sensor, external light source, external proximity device, and an external finger print device.

As also shown in FIG. 4, the Smart Box can also include an audio enclosure 315 with audio dampening 340, a custom phone holder 310 affixed to a custom base plate 345.

Figure 5:
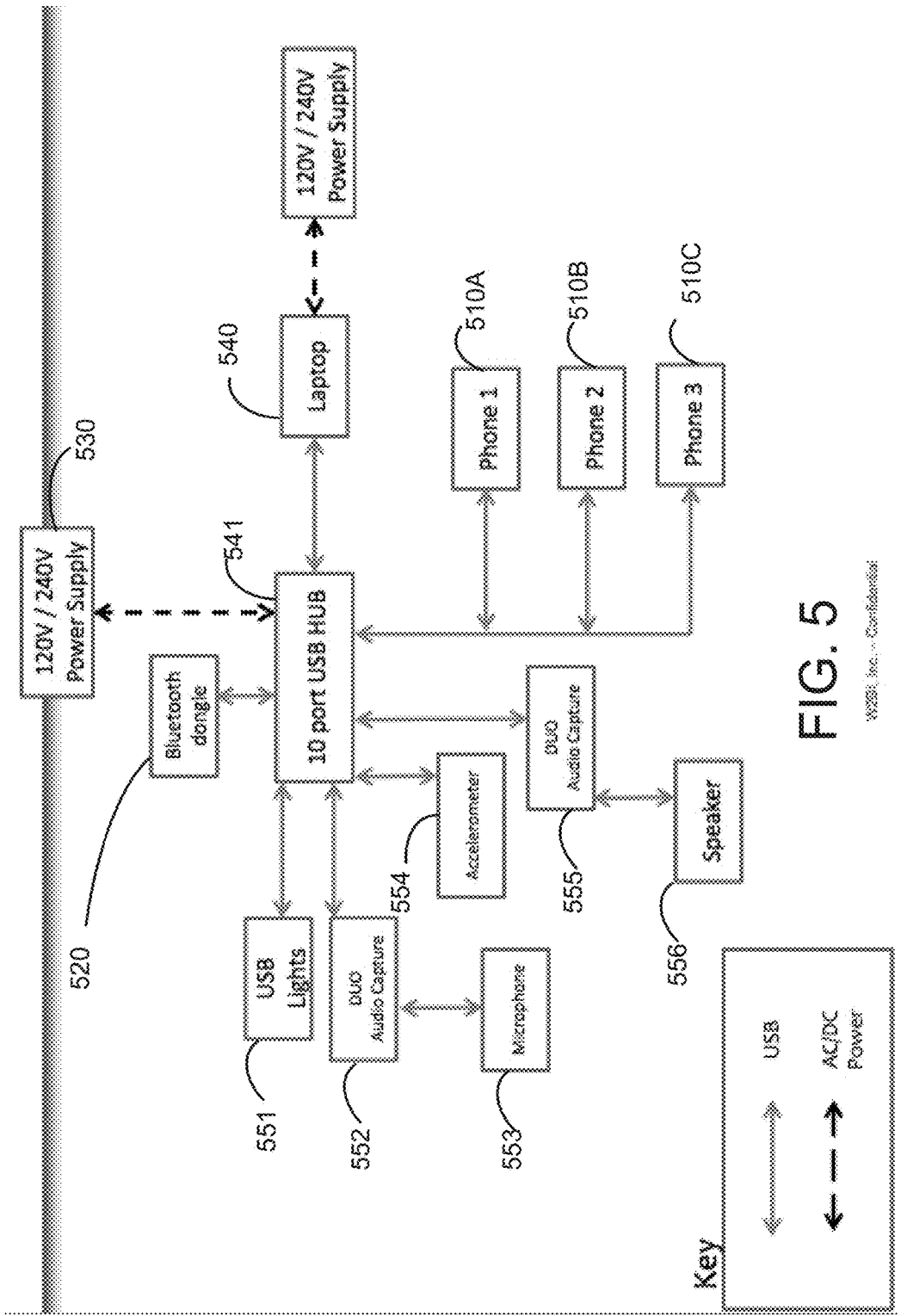
FIG. 5 is a functional power flow block diagram of the Smart Box in accordance with an embodiment of the present invention.

FIG. 5 is a functional power flow block diagram of the Smart Box in accordance with an embodiment of the present invention. In the embodiment shown in FIG. 5, three smart devices, 510A, 510B and 510C can be tested inside the Smart Box at the same time. The Smart Box comprises a 10-port USB hub 541, which is powered off power supply 530.

The USB hub 541 is used to supply power to the various external components within the Smart Box and the smart devices 510A-C. For example, the USB hub powers the lights 551, the dual audio capture and generator devices 552 and 555, the accelerometer 554, the microphone 553, the Bluetooth dongle 520, and the speaker 556 can all be powered using the USB hub 541. Further, the USB hub 541 is also operable to communicate information between the various components and the test automation software on system controller 540. This configuration is advantageous because it allows embodiments of the present invention to stress the phone physically while being in communication with the automation software on system controller 540 at the same time. For example, the stylus and the smart device 510A may be interacting physically at the same time as an application package is being downloaded to smart device 510A from the test software to stress the memory or CPU.

Figure 6:
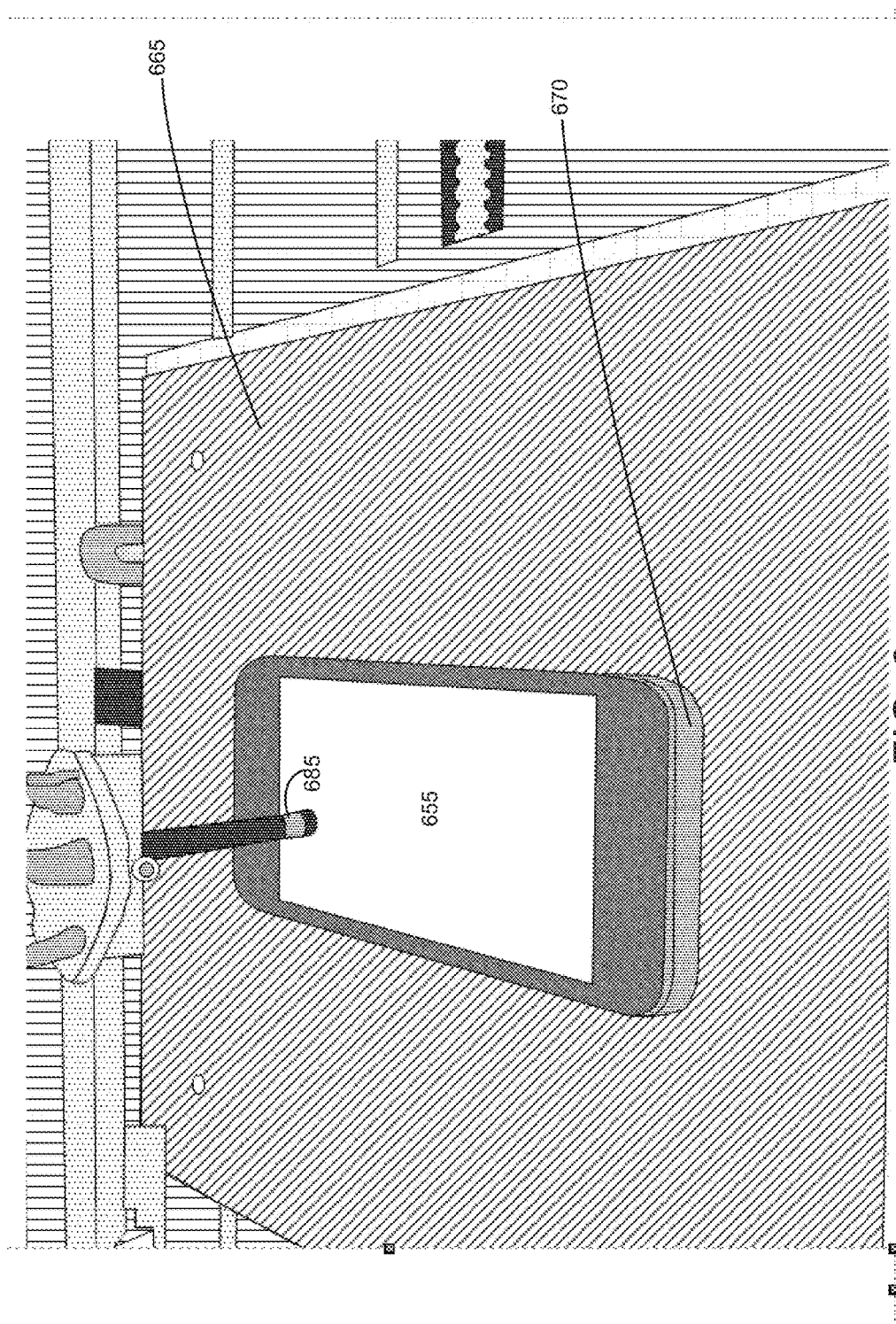
FIG. 6 illustrates the stylus comprising a capacitive element being used to activate the touch screen display of the smart device to simulate human interation therewith in accordance with an embodiment of the present invention.

FIG. 6 illustrates the stylus comprising a capacitive element being used to activate the touch screen display of the smart device to simulate human interaction therewith in accordance with an embodiment of the present invention. As discussed above, in one embodiment of the present invention, the capacitive stylus 685 is connected to a robotic arm that allows it to move in the z-direction. The smart device 655 typically rests in a custom phone holder 670 affixed to a smart plate 665 that is also controlled by robotics and moves in the x-y plane. As will be detailed in the discussion for FIG. 7, each custom phone holder 670 and/or smart plate 665 is customized for a different model of smart device (e.g. phones, tablets, etc.). Either the entire smart plate 665 can be customized or the custom phone holder 670 itself can be customized to accommodate phones of various form factors. Customizing the smart plate and/or holder to each phone model is advantageous because it allows the Smart Box to handle a high degree of skew between the devices and accommodate different screen sizes and aspect ratios.

Figure 7:
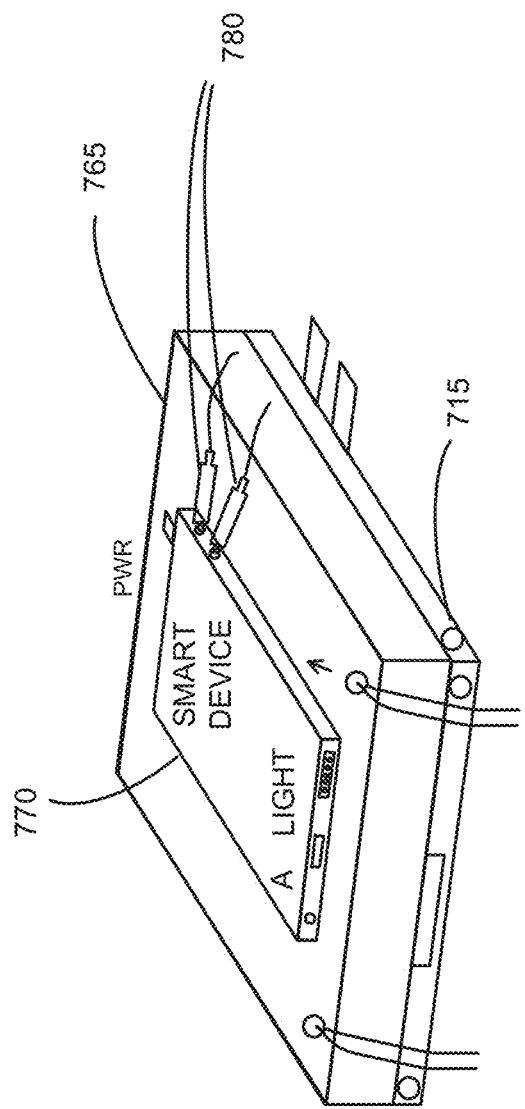
FIG. 7 illustrates the custom phone holder operable to be customized for different models of smart devices in accordance with an embodiment of the present invention.

FIG. 7 illustrates the custom phone holder operable to be customized for different models of smart devices in accordance with an embodiment of the present invention. Each model of smart device will have a different custom phone holder and/or smart plate associated with it, wherein the phone holder will be customized to the device specifications. In other words, the mould for each model of device will be customized. In order to switch the device being tested in Smart Box, the smart plate and/or custom phone holder would simply be replaced with a model customized to the particular device that needs to be tested.

In one embodiment, each custom phone holder 765 will have its own device code and this information will be communicated to the system controller in order to determine what type of device 770 is placed into the custom phone holder. For example, the custom phone holder can be equipped with a QR code, which is communicated to the system controller.

As mentioned previously, in one embodiment, the smart plate 715 and the custom holder 765 constitute a single unit having a unique QR code. This QR code can be communicated to the system controller via USB or Wi-Fi. In another embodiment, the smart plate (or base plate) 715 can comprise dowels for affixing the custom holder 765 onto the smart plate.

The system controller can use the QR code to determine device specifications, e.g., thickness of device, diagonal length of screen, etc. and to calibrate the phone. For example, the robotics may be used to touch a single point on the screen using the stylus and use the information from the contact to determine where the smart device is positioned relative to the stylus and other components. In other words, the QR code and robotics in combination with the system controller can be used to perform an x-y calibration on the phone to determine its precise location. Once the x-y calibration is performed and the corners of the device are located, the system controller can determine where the various physical and soft buttons, e.g., Home button are on the device. Once a device is calibrated, its information can be saved in a calibration file on system controller and retrieved the next time the same device is tested.

In one embodiment, the calibration information can be communicated to other components within the Smart Box that interface with the smart device. For example, once the diagonal length of the screen is determined through the calibration process, the stylus can be programmed by the system controller to adjust to the screen size of the smart device.

The calibration information and device specifications can then be used by the robotics within the Smart Box to actuate either on or off-screen buttons on the smart device. For example, when the device specifics are known, the stylus can be programmed to actuate the Home button on the smart device.

Accordingly, embodiments of the present invention can drive the smart device from the system controller through the USB or Wi-Fi connection. In one embodiment, the system controller draws information from the smart device, e.g., metadata regarding information being displayed on the smart device screen. Subsequently, using the calibration information, the metadata, and device specifications, the system controller can determine the location for active regions on the touch screen panel, soft buttons and physical buttons on the smart device screen. This information can be translated to an X-Y coordinate or location for the robotics to interact physically with the smart device.

In one embodiment, the Smart Box can comprise actuators 780 (also controlled by the system controller) or servos used to activate buttons on the smart device. For example, actuators can be used to activate the volume buttons, ring silent switch, and/or the wake/sleep button. The actuators can either be moulded into the smart plate itself or they can be outside the plate and configurable. In one embodiment, the stylus 385 itself can also be programmed by the system controller to activate the buttons.

In one embodiment, actuators or servos may be used to insert the power cable into the phone. Accordingly, the custom phone holder should be able to hold the device physically secure so that the power cable into the smart device. The actuators may either be built into the custom phone holder itself or be external. Similarly, with the audio connections, e.g., headphones, microphone, etc., actuators may be built into the phone holder in order to plug in the various connections.

In one embodiment, in order to reduce human intervention and further automate the testing process, the Smart Box 300 can be equipped with a robotic arm that places the smart device into the custom phone holder.

In one embodiment, the smart plate underneath the custom holder can rotate in order to switch the device from portrait to landscape mode. Also, in one embodiment, the smart plate can comprise hinges that allow it to rotate around the x or y-axes in order to test the gravity sensors and gyro functionality of the smart device.

In one embodiment, the smart plate can have a temperature sensor built into it. The temperature sensor can, for example, measure the heat emanating from the device using infrared technology. Also, the smart plate can have a heating or cooling element built into it to artificially raise or lower the temperature of the smart device to determine its operating specifications.

In one embodiment, the smart plate can also have a vibration sensor built into it. The vibration sensor allows the vibrate feature of the smart device to be tested.

As explained above, embodiments of the present invention are advantageous because they allow a) physical interaction with the phone using (e.g. using a stylus, sound, light, etc.; b) automated control of the phone using a system controller and an appropriate communication protocol (e.g., USB or WiFi); c) application packages installed in the system controller that stress the phone; and d) comprise external sensors that monitor the phone, e.g., audio, camera, accelerometer, etc. The below series of figures and flowcharts provide an illustration of the manner in which embodiments of the present invention perform the various tests on a smart device.

Testing the Smart Device Touch Screen

Figure 8:
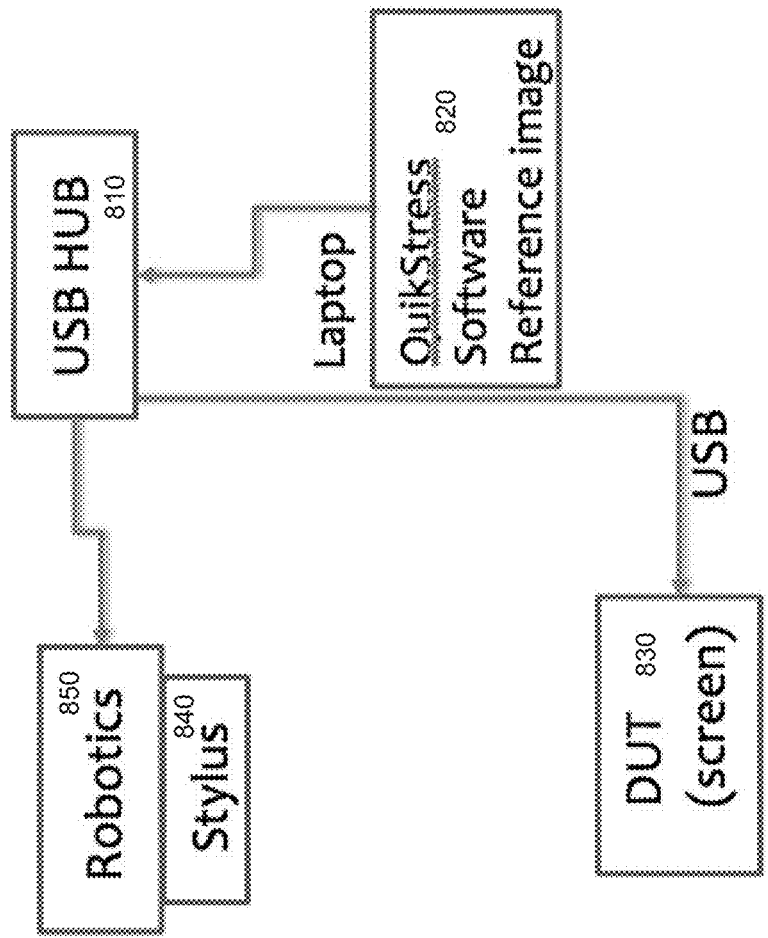
FIG. 8 is a functional block diagram illustrating the manner in which the touch screen of the smart device can be tested using the Smart Box in accordance with an embodiment of the present invention.

FIG. 8 is a functional block diagram illustrating an exemplary manner in which the touch screen of the smart device can be tested using the Smart Box in accordance with an embodiment of the present invention. As shown in FIG. 8 the system controller 820 comprises a software package (e.g., Quikstress) that can communicate with the smart device under test (DUT 830) and the robotics 850 (e.g., stylus 840) through the USB hub 810.

Figure 9:
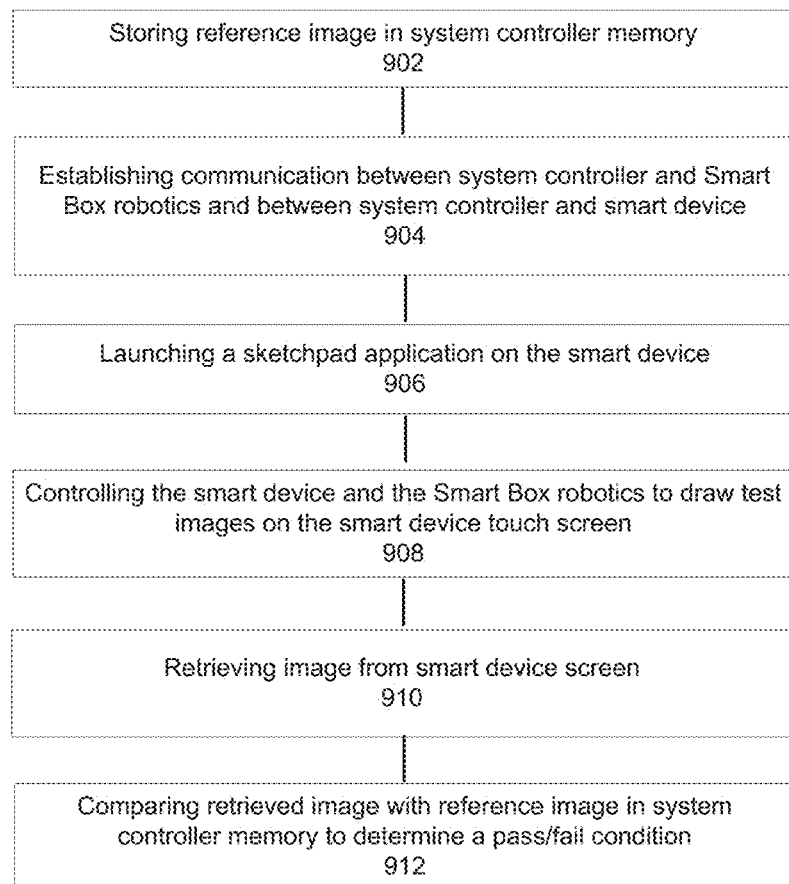
FIG. 9 depicts a flowchart of an exemplary computer controlled process of testing the touch screen of a smart device using the Smart Box in accordance with an embodiment of the present invention.

FIG. 9 depicts a flowchart of an exemplary computer controlled process of testing the touch screen of a smart device using the Smart Box in accordance with an embodiment of the present invention.

At step 902, a reference image is stored in the memory of system controller 820. At step 904, communication is established between the system controller 820 and the smart device 830, and also between the system controller 820 and the robotics 850 within the Smart Box. In one embodiment, this communication is performed using USB, Wi-Fi or any other suitable protocol. The communication, in one embodiment, can flow through USB hub 810.

At step 906, a sketchpad application is launched on the smart device. In other embodiments, different applications may be used for testing the touch screen.

At step 908, the robotics 850 (e.g., stylus 840, smart plate etc.) and the smart device are controlled to draw test images on the smart device touch screen.

At step 910, the sketched image is retrieved from the smart device.

Finally, at step 912, the retrieved image is compared with the reference image stored in the system controller memory for similarity to determine if the device passed or failed the test.

As mentioned above, embodiments of the present invention advantageously allow robotic components within the Smart Box to physically interact with the phone while the smart device is being manipulated through software and information is being retrieved from the smart device for analysis using a system controller.

Further, embodiments of the present invention can advantageously test the entire screen by making contact with all areas of the screen using the stylus to ensure that all the pixels on the screen are functioning properly. This eliminates human error and is more efficient that prior methods of testing screens on smart devices that required active human interaction and contact.

Also, in one embodiment, the stylus can be used to draw various shapes on the device screen to test for on-screen lineation and multi-spot touching. For example, the stylus can be used to trace a circle or draw a square and the information can be captured by the system controller to determine if the touch screen is functioning properly. The stylus can also be used to test gesture recognition functionality on the touch screen.

Figure 10:
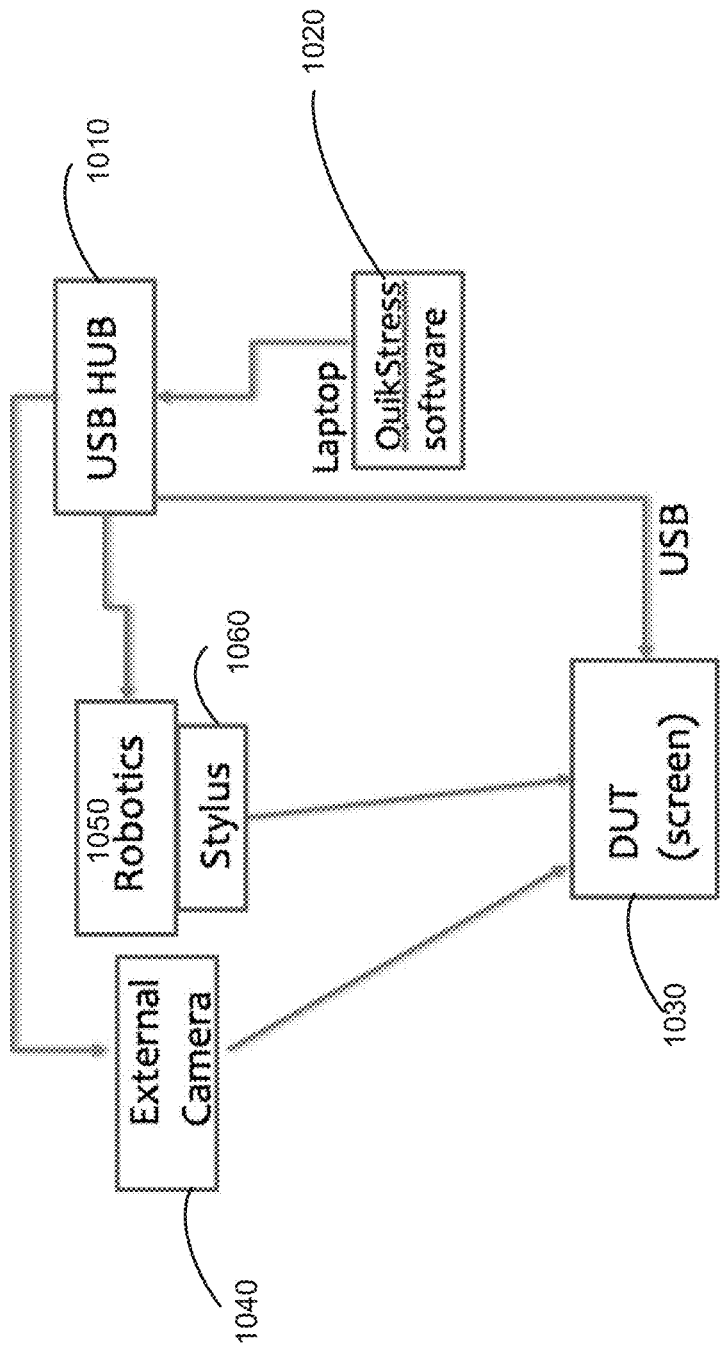
FIG. 10 is a functional block diagram illustrating another embodiment for testing the touch screen of the smart device using the Smart Box in accordance with an embodiment of the present invention.

FIG. 10 is a functional block diagram illustrating another embodiment for testing the touch screen of the smart device using the Smart Box in accordance with an embodiment of the present invention. As shown in FIG. 10 the system controller 1020 comprises a software package (e.g., Quikstress) that can communicate with the smart device under test (DUT 1030), the robotics 1050 (e.g., stylus 1060), and the external camera 1040 through the USB hub 1010.

Figure 11:
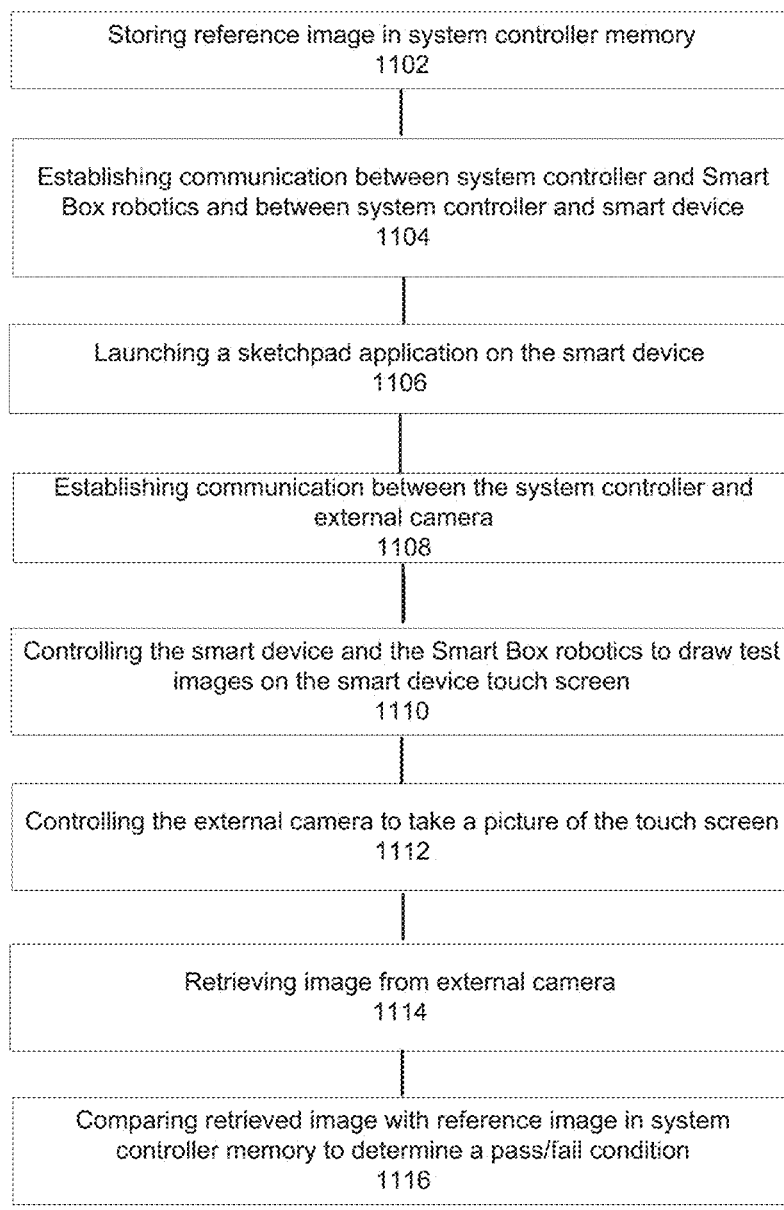
FIG. 11 depicts a flowchart of another exemplary computer controlled process of testing the touch screen of a smart device using the Smart Box in accordance with an embodiment of the present invention.

FIG. 11 depicts a flowchart of another exemplary computer controlled process of testing the touch screen of a smart device using the Smart Box in accordance with an embodiment of the present invention.

At step 1102, a reference image is stored or resides in the memory of system controller 1020. At step 1104, communication is established between the system controller 1020 and the smart device 1030, and also between the system controller 1020 and the robotics 1050 within the Smart Box. In one embodiment, this communication is performed using USB, Wi-Fi or any other suitable protocol. The communication, in one embodiment, can flow through USB hub 1010.

At step 1106, a sketchpad application or other graphics application is launched on the smart device. In other embodiments, different applications may be used for testing the touch screen.

At step 1108, communication is established between the system controller and the external camera 1040.

At step 1110, the robotics 1050 (e.g., stylus 1060, smart plate etc.) and the smart device are controlled to draw test images on the smart device touch screen.

At step 1112, the external camera 1040 is controlled by the system controller to take a picture of the touch screen on the smart device.

At step 1114, the sketched image is retrieved from the external camera.

Finally, at step 1116, the retrieved image is compared with the reference image stored in the system controller memory for similarity to determine if the device passed or failed the test.

Testing the Cameras on the Smart Device

Figure 12:
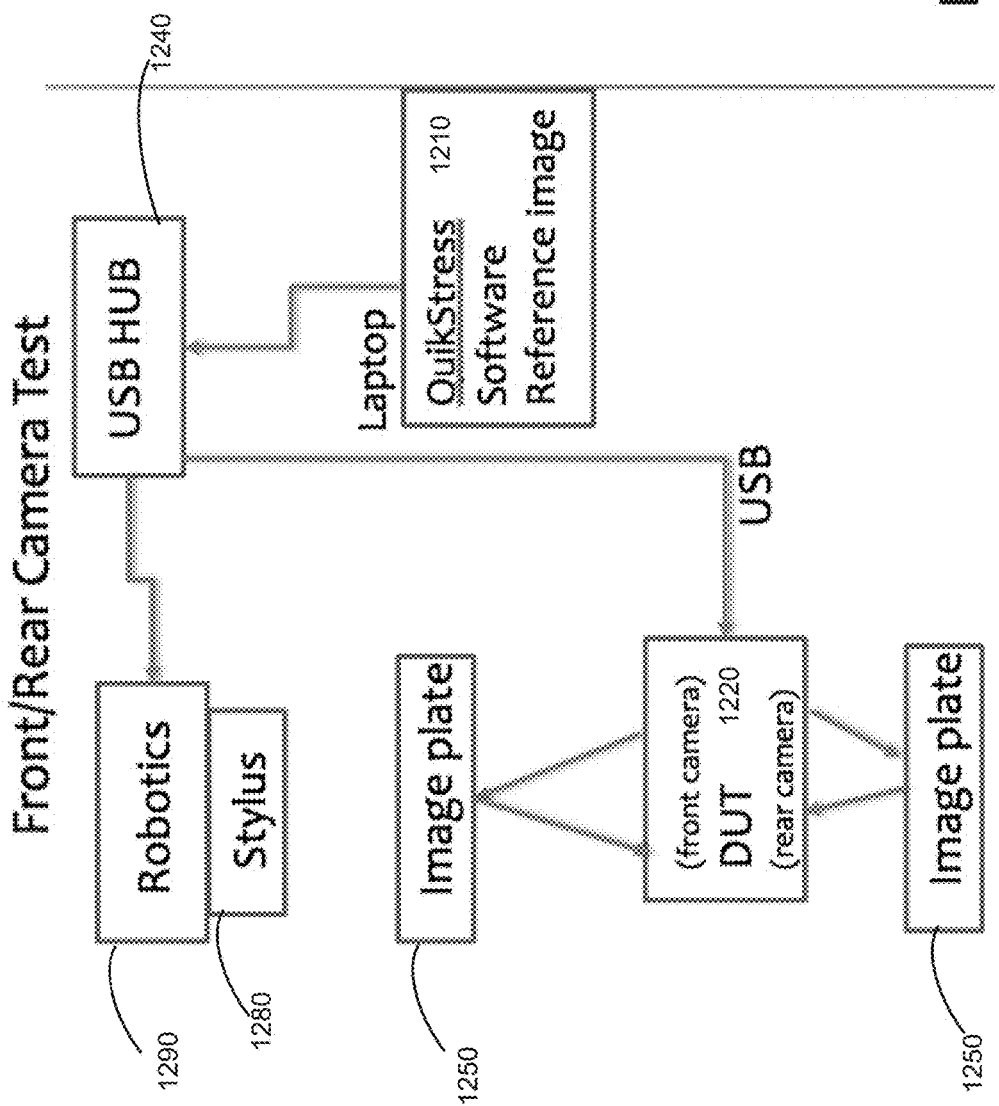
FIG. 12 is a functional block diagram illustrating a system for testing the front and rear camera of the smart device using the Smart Box in accordance with an embodiment of the present invention.

FIG. 12 is a functional block diagram illustrating a system for testing the front and rear camera of the smart device using the Smart Box in accordance with an embodiment of the present invention. As shown in FIG. 12 the system controller 1210 comprises a software package (e.g., Quikstress) that can communicate with the smart device under test (DUT 1220) and the robotics 1290 (e.g., stylus 1280), through the USB hub 1240. Further, the Smart Box can comprise one or more physical reference images, e.g., a reference images on image plates 1250 (similar to image plate 350 as shown in FIG. 3).

Figure 13:
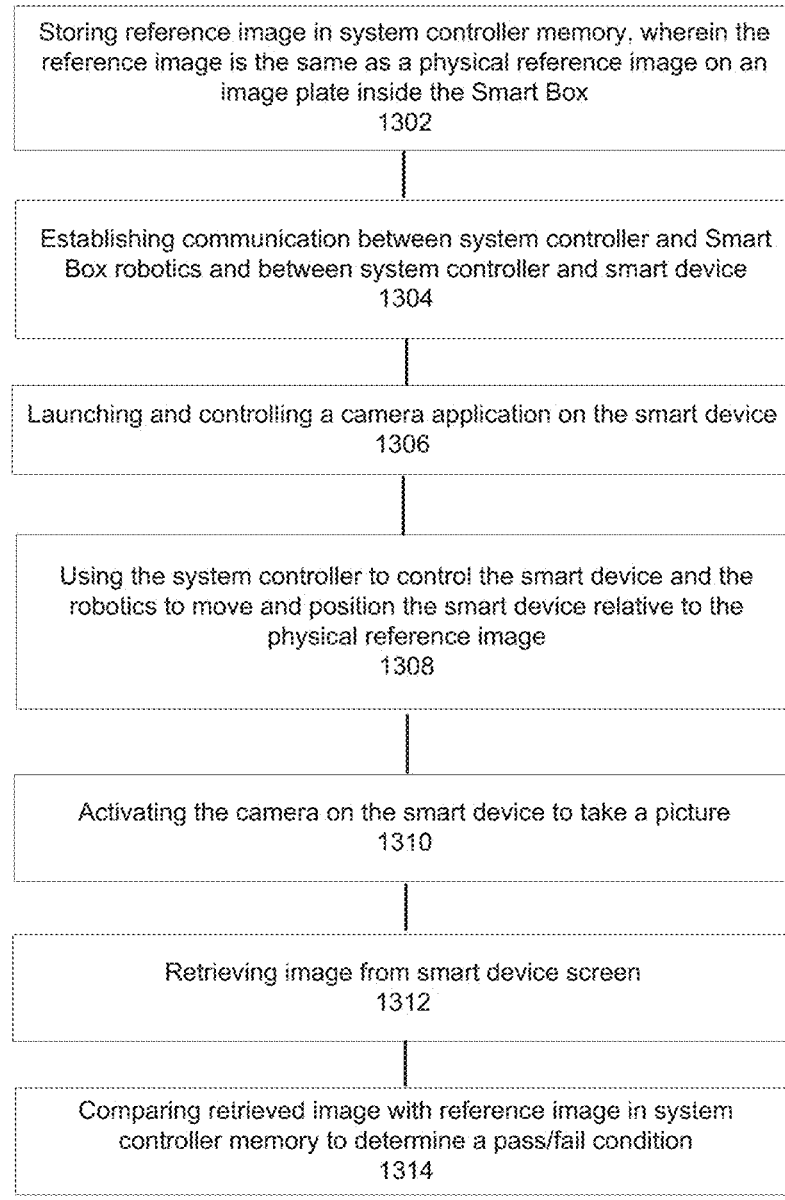
FIG. 13 depicts a flowchart of another exemplary computer controlled process of testing the front and rear camera of a smart device using the Smart Box in accordance with an embodiment of the present invention.

FIG. 13 depicts a flowchart of another exemplary computer controlled process of testing the front and rear camera of a smart device using the Smart Box in accordance with an embodiment of the present invention.

At step 1302, a reference image is stored or resides in the memory of system controller 1210. This reference image is an instantiation of the physical reference image present on the image plate(s) 1250 within the Smart Box. In one embodiment, the Smart Box comprises a single image plate and the smart plate 345 is flipped to test both the front and rear camera using the same physical reference image. In a different embodiment, the Smart Box comprises two discrete image plates (one above the smart plate for testing the front facing camera and one below the smart plate for testing the rear facing camera) (as shown in FIG. 12).

At step 1304, communication is established between the system controller 1210 and the smart device 1220, and also between the system controller and the robotics 1290 within the Smart Box. In one embodiment, this communication is performed using USB, Wi-Fi or any other suitable protocol. The communication, in one embodiment, can flow through USB hub 1240.

At step 1306, a default camera application is launched on the smart device. In other embodiments, different applications that use the camera may be used for testing the touch screen also.

At step 1308, the system controller controls the smart device and robotics to move and position the smart device relative to the physical reference image so that the front camera can obtain a clear picture of the physical reference image above the smart plate and so the rear camera can obtain a clear picture of the physical reference image below the smart plate.

At step 1310, the camera(s) on the smart device are activated to take an image of the image plate(s).

At step 1312, the image or images taken by the camera(s) can be retrieved from the smart device using the system controller.

Finally, at step 1314, the retrieved image is compared with the reference image stored in the system controller memory to determine if the device passed or failed the test.

In one embodiment, the flash on the camera can also be tested as part of the camera test performed by the Smart Box. Typically, a sensor within the Smart Box would be able to detect if the flash on the camera is functioning. As discussed previously, the Smart Box can also comprise an external light sensor or meter to measure light intensity from the smart device (e.g., flash and display light intensity). In addition, the external camera within the Smart Box can also be used during the flash test. The camera can be configured to test the sensitivity of the flash. During testing, the flash can either be driven using an Application Programming Interface (API) or it can be activated by navigating through the user interface using the stylus.

In one embodiment, the fixed reference images within the Smart Box can comprise color charts. By capturing images of the color charts and transmitting them to the system controller, embodiments of the present invention can test the smart device cameras for color, blurriness and orientation.

Testing the Audio Components on the Smart Device

Figure 14:
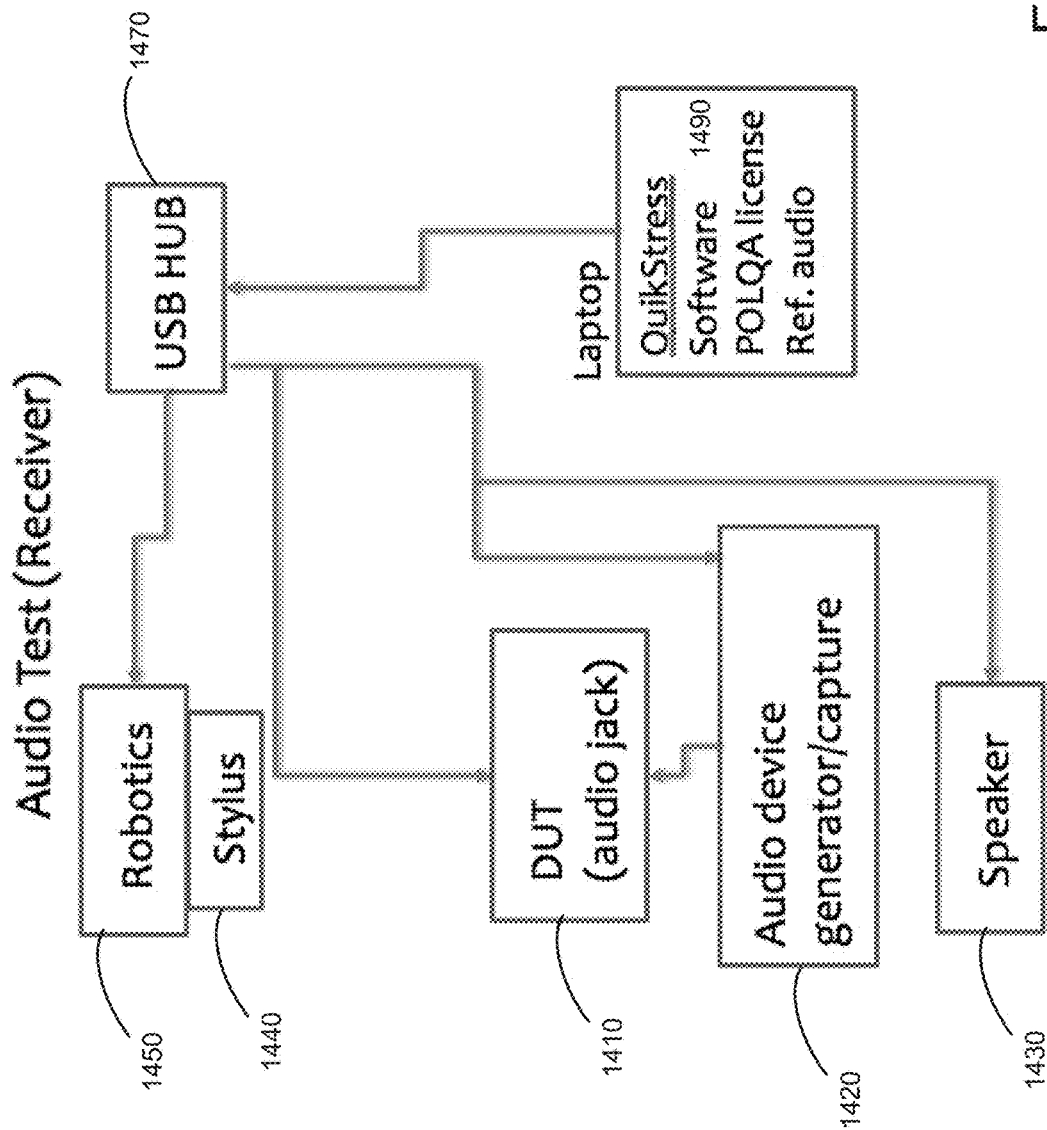
FIG. 14 is a functional block diagram illustrating a system for testing the audio receiver of the smart device using the Smart Box in accordance with an embodiment of the present invention.

FIG. 14 is a functional block diagram illustrating a system for testing the audio receiver of the smart device using the Smart Box in accordance with an embodiment of the present invention. As shown in FIG. 14 the system controller 1490 comprises a software package (e.g., Quikstress) that can communicate with the smart device under test (DUT 1410) and the robotics 1450 (e.g., stylus 1440), through the USB hub 1470. Further, the system controller can also control the audio device 1420 within the Smart Box and the speaker 1430. In the embodiment illustrated in FIG. 14, the system controller also comprises a reference audio file and the POLQA library (discussed above).

Figure 15:
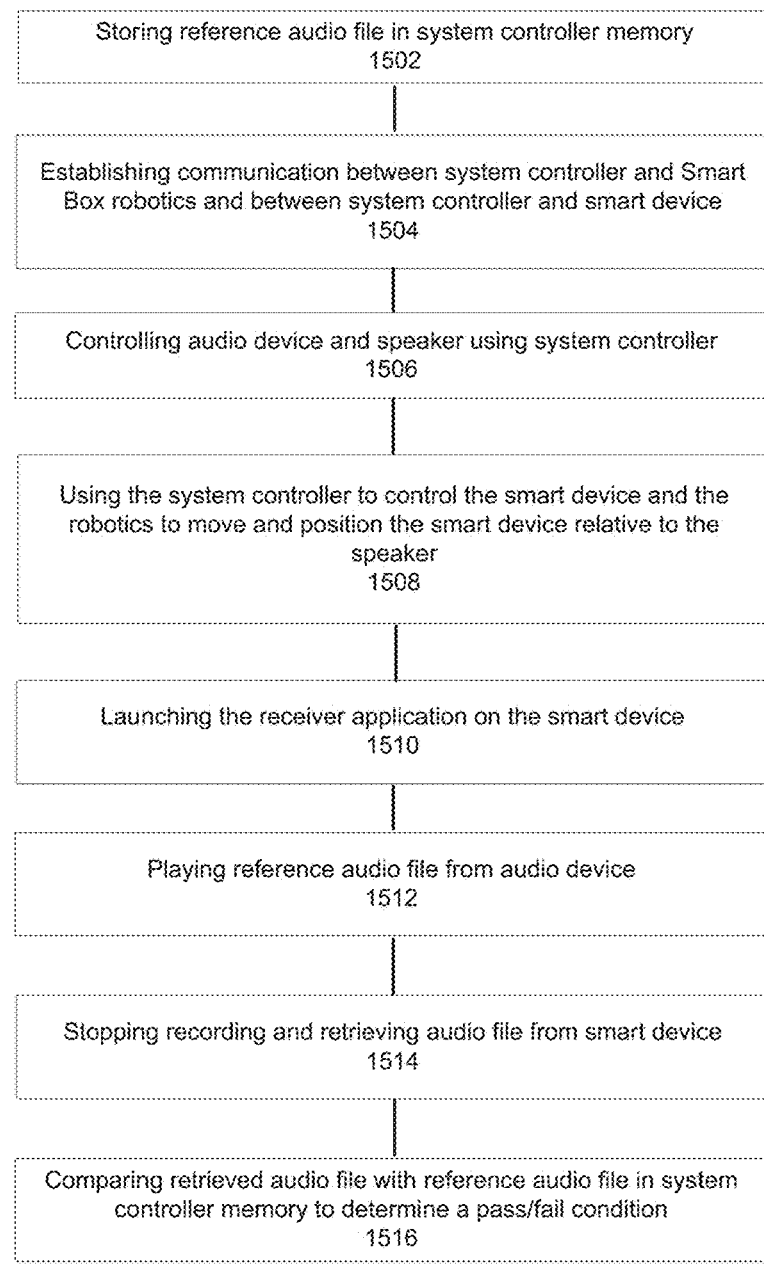
FIG. 15 depicts a flowchart of another exemplary computer controlled process of testing the audio receiver of a smart device using the Smart Box in accordance with an embodiment of the present invention.

FIG. 15 depicts a flowchart of another exemplary computer controlled process of testing the audio receiver of a smart device using the Smart Box in accordance with an embodiment of the present invention.

At step 1502, a reference audio file is stored in the memory of system controller 1490.

At step 1504, communication is established between the system controller 1490 and the smart device 1410, and also between the system controller and the robotics 1450 (e.g. stylus 1440) within the Smart Box. In one embodiment, this communication is performed using USB, Wi-Fi or any other suitable protocol. The communication, in one embodiment, can flow through USB hub 1470.

At step 1506, audio device 1420 and speaker 1430 is controlled using the system controller.

At step 1508, the system controller is used to control the smart device and the robotics to move and position the smart device in an appropriate position relative to the speaker 1430.

At step 1510, an audio receiver application on the smart device is launched. At step 1512, the reference audio file is played using audio device 1420 and speaker 1430.

At step 1514, the system controller stop recording the audio on the smart device and retrieves the file from the smart device. At step 1516, the retrieved audio file is compared with the reference audio file stored in the system controller memory to determine if the device passed or failed the test. In one embodiment, the POLQA library can be used to perform the file comparison and determine a pass/fail condition.

Figure 16:
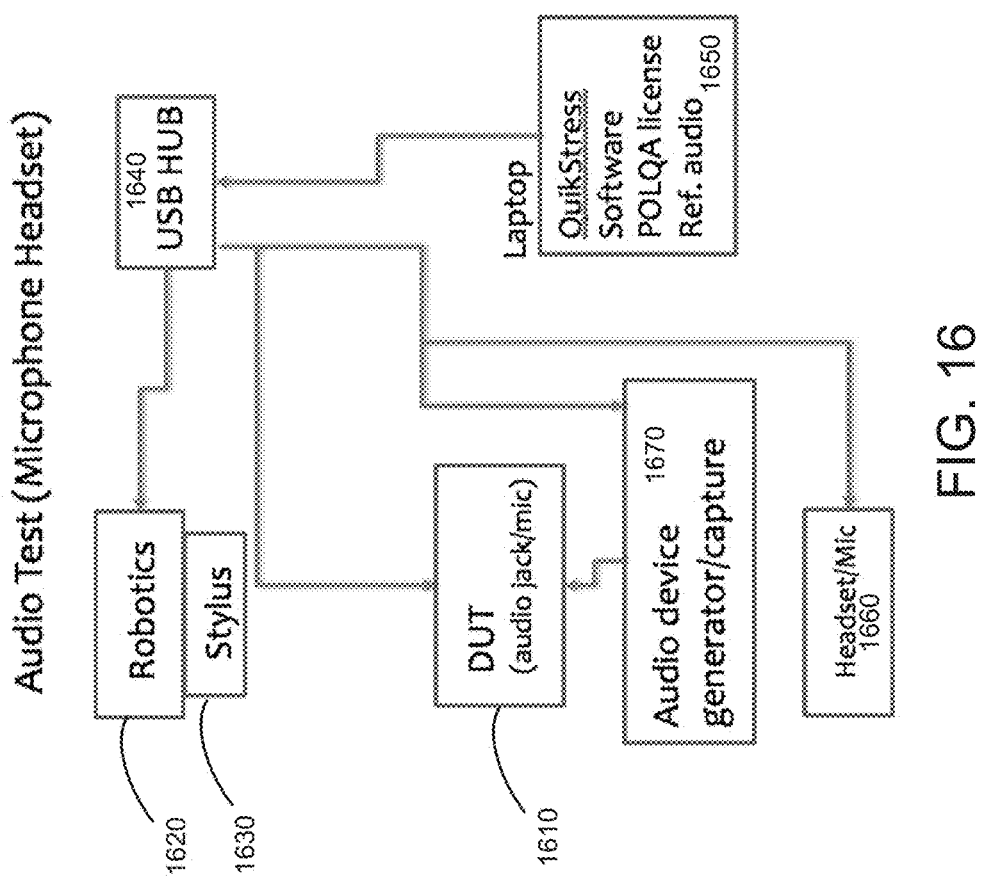
FIG. 16 is a functional block diagram illustrating a system for testing the audio jack/microphone of the smart device using the Smart Box in accordance with an embodiment of the present invention.

FIG. 16 is a functional block diagram illustrating a system for testing the audio jack/microphone of the smart device using the Smart Box in accordance with an embodiment of the present invention. As shown in FIG. 16 the system controller 1650 comprises a software package (e.g., Quikstress) that can communicate with the smart device under test (DUT 1610) and the robotics 1620 (e.g., stylus 1630), through the USB hub 1640. Further, the system controller can also control the audio device 1670 within the Smart Box and the headset and/or microphone 1660. In the embodiment illustrated in FIG. 16, the system controller also comprises a reference audio file and the POLQA library (discussed above).

Figure 17:
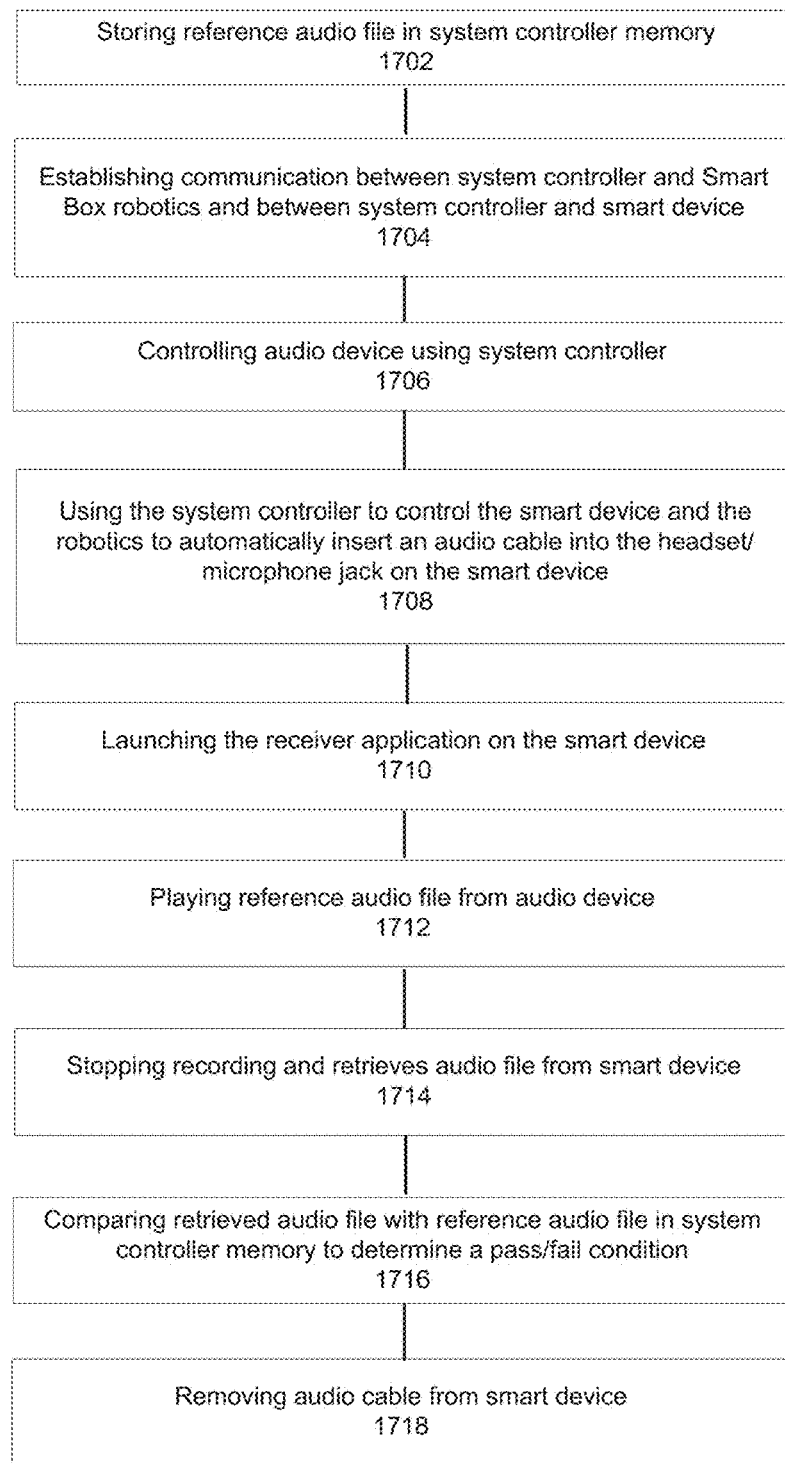
FIG. 17 depicts a flowchart of another exemplary computer controlled process of testing the audio jack/microphone of a smart device using the Smart Box in accordance with an embodiment of the present invention.

FIG. 17 depicts a flowchart of another exemplary computer controlled process of testing the audio jack/microphone of a smart device using the Smart Box in accordance with an embodiment of the present invention.

At step 1702, a reference audio file is stored or resides in the memory of system controller 1650.

At step 1704, communication is established between the system controller and the smart device 1610, and also between the system controller and the robotics 1620 (e.g. stylus 1630) within the Smart Box. In one embodiment, this communication is performed using USB, Wi-Fi or any other suitable protocol. The communication, in one embodiment, can flow through USB hub 1640.

At step 1706, audio device 1670 is controlled using the system controller.

At step 1708, the system controller is used to control the smart device and the robotics to automatically insert an audio cable 1660 into the headset/microphone jack of the smart device. In one embodiment, an audio cable can be plugged into the audio jack of the smart device automatically using commands sent from the system controller to a servo on the smart plate or custom holder.

At step 1710, an audio receiver application on the smart device is launched. At step 1712, the reference audio file is played using audio device 1670.

At step 1714, the system controller stops recording the audio on the smart device and retrieves the file from the smart device. At step 1716, the retrieved audio file is compared with the reference audio file stored in the system controller memory to determine if the device passed or failed the test. In one embodiment, the POLQA library can be used to perform the file comparison and determine a pass/fail condition.

At step 1718, the audio cable is removed from the smart device using a servo or actuator on the custom holder on the smart plate under the control of the system controller.

Figure 18:
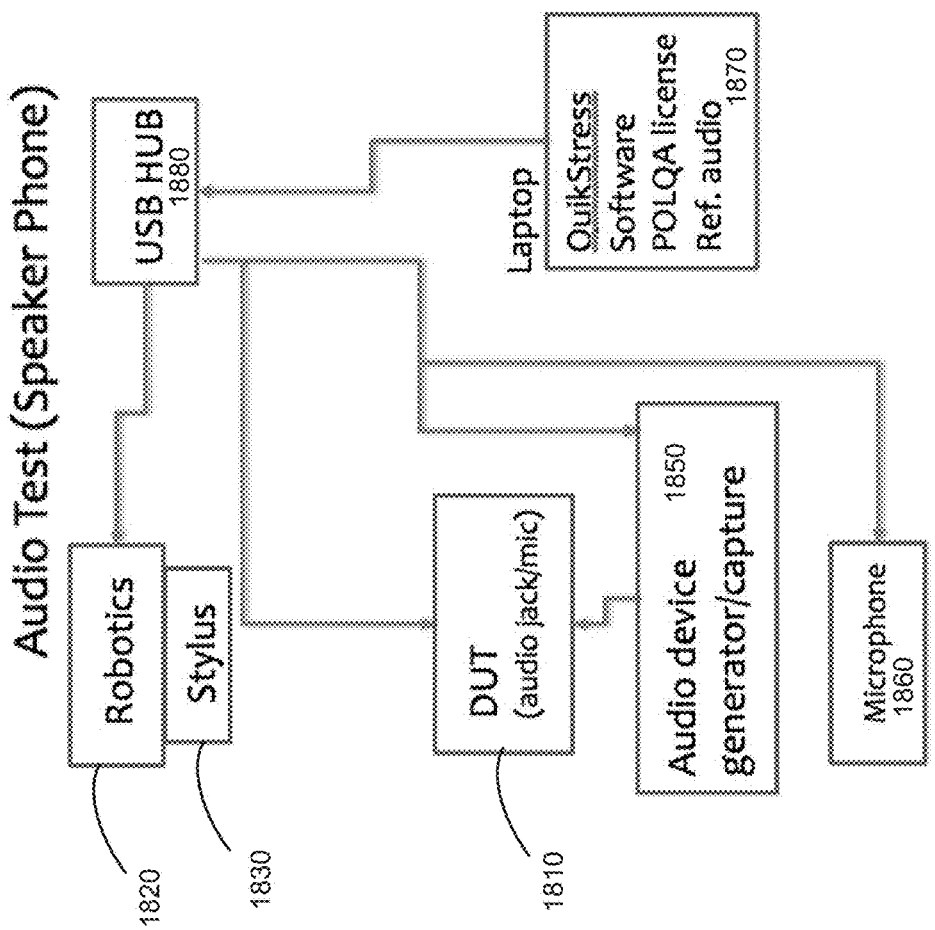
FIG. 18 is a functional block diagram illustrating a system for testing the speaker phone functionality on the smart device using the Smart Box in accordance with an embodiment of the present invention.

FIG. 18 is a functional block diagram illustrating a system for testing the speaker phone functionality on the smart device using the Smart Box in accordance with an embodiment of the present invention. As shown in FIG. 18 the system controller 1870 comprises a software package (e.g., Quikstress) that can communicate with the smart device under test (DUT 1810) and the robotics 1820 (e.g., stylus 1830), through the USB hub 1880. Further, the system controller can also control the audio device 1850 within the Smart Box and the external Smart Box microphone 1860. In the embodiment illustrated in FIG. 18, the system controller also comprises a reference audio file and the POLQA library (discussed above).

Figure 19:
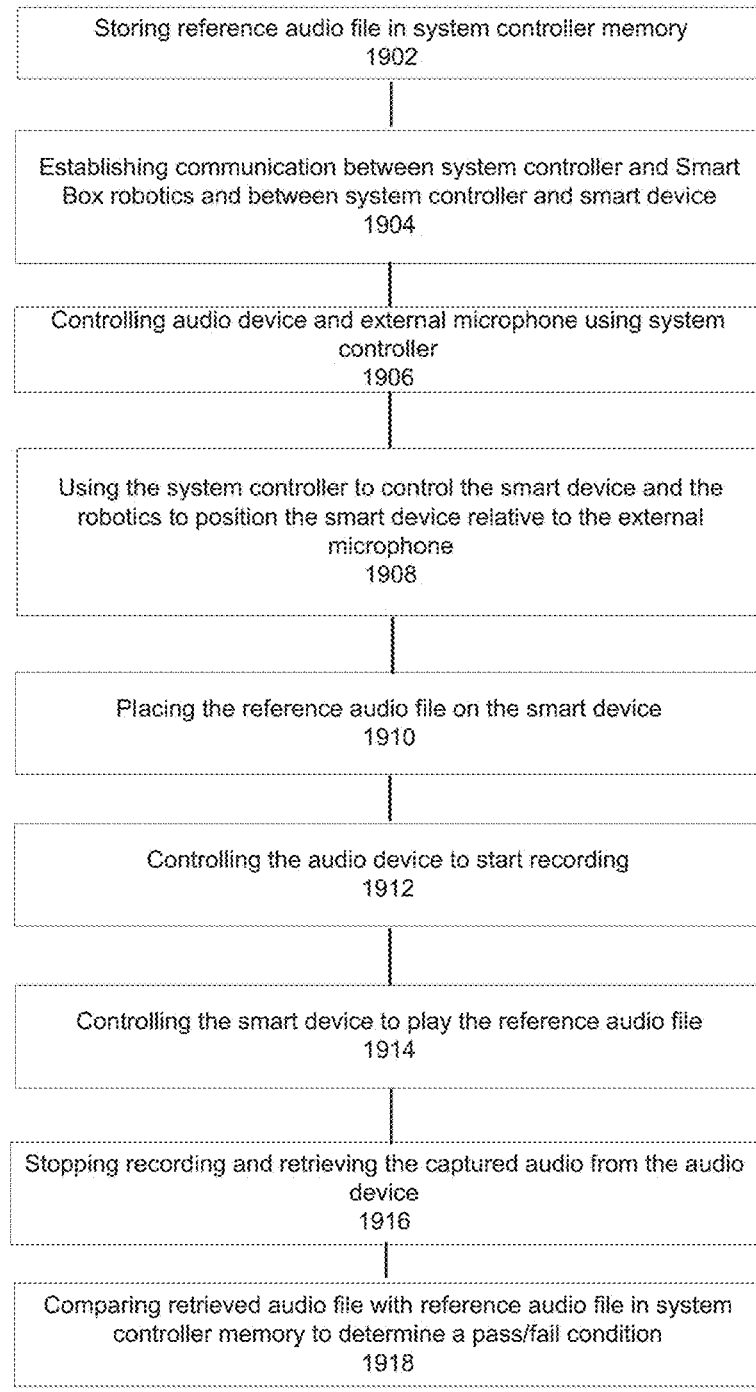
FIG. 19 depicts a flowchart of another exemplary computer controlled process of testing the speaker phone functionality of a smart device using the Smart Box in accordance with an embodiment of the present invention.

FIG. 19 depicts a flowchart of another exemplary computer controlled process of testing the speaker phone functionality of a smart device using the Smart Box in accordance with an embodiment of the present invention.

At step 1902, a reference audio file is stored or resides in the memory of system controller 1870.

At step 1904, communication is established between the system controller and the smart device 1810, and also between the system controller and the robotics 1820 (e.g. stylus 1830) within the Smart Box. In one embodiment, this communication is performed using USB, Wi-Fi or any other suitable protocol. The communication, in one embodiment, can flow through USB hub 1880.

At step 1906, audio device 1850 and external Smart box microphone 1860 are controlled using the system controller.

At step 1908, the system controller is used to control the smart device and the robotics to position the smart device in an appropriate position relative to the microphone 1860.

At step 1910, a reference audio file is placed on the smart device using the system controller. At step 1912, the audio device 1850 is controlled using the system controller to start recording.

At step 1914, the smart device is controlled to play the reference audio file. Subsequently, at step 1916, the recording is stopped and the captured audio file is retrieved from the audio device 1850.

At step 1918, the retrieved audio file is compared with the reference audio file stored in the system controller memory to determine if the device passed or failed the test. In one embodiment, the POLQA library can be used to perform the file comparison and determine a pass/fail condition.

Figure 20:
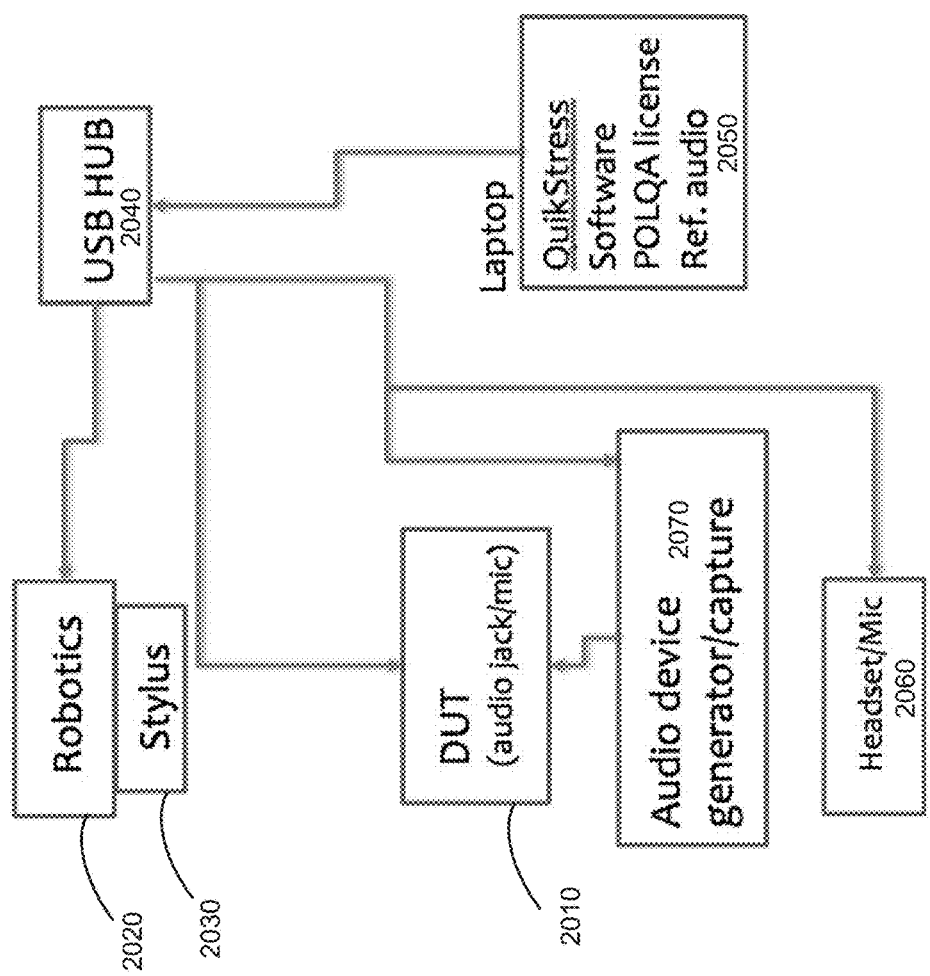
FIG. 20 is a functional block diagram illustrating a system for testing the audio jack/headset of the smart device using the Smart Box in accordance with an embodiment of the present invention.

FIG. 20 is a functional block diagram illustrating a system for testing the audio jack/headset of the smart device using the Smart Box in accordance with an embodiment of the present invention. As shown in FIG. 20 the system controller 2050 comprises a software package (e.g., Quikstress) that can communicate with the smart device under test (DUT 2010) and the robotics 2020 (e.g., stylus 2030), through the USB hub 2040. Further, the system controller can also control the audio device 2070 within the Smart Box and the headset and/or microphone 2060. In the embodiment illustrated in FIG. 20, the system controller also comprises a reference audio file and the POLQA library (discussed above).

Figure 21:
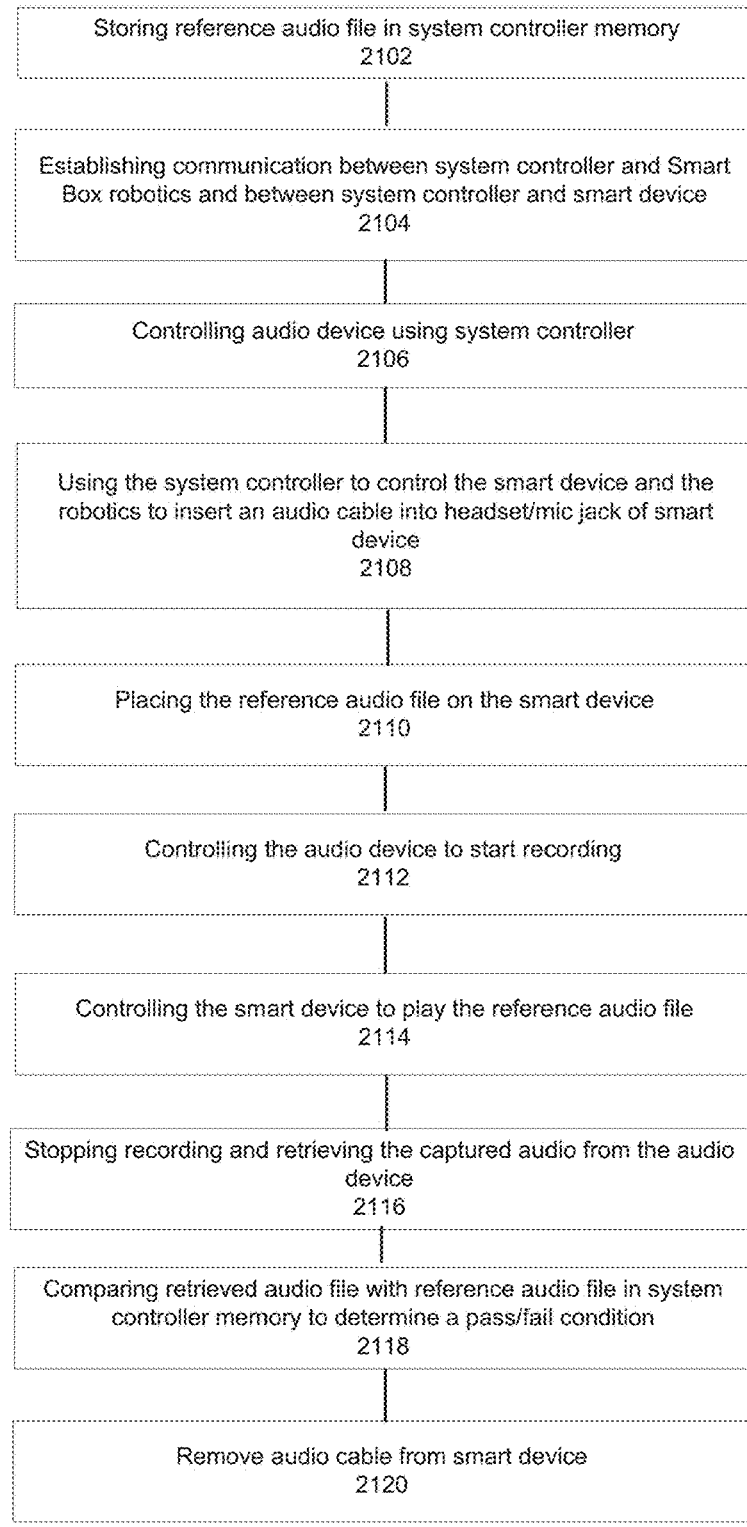
FIG. 21 depicts a flowchart of another exemplary computer controlled process of testing the headset/audio jack of a smart device using the Smart Box in accordance with an embodiment of the present invention.

FIG. 21 depicts a flowchart of another exemplary computer controlled process of testing the headset/audio jack of a smart device using the Smart Box in accordance with an embodiment of the present invention.

At step 2102, a reference audio file is stored or resides in the memory of system controller 2050.

At step 2104, communication is established between the system controller and the smart device 2010, and also between the system controller and the robotics 2020 (e.g. stylus 2030) within the Smart Box. In one embodiment, this communication is performed using USB, Wi-Fi or any other suitable protocol. The communication, in one embodiment, can flow through USB hub 2040.

At step 2106, audio device 2070 is controlled using the system controller.

At step 2108, the system controller is used to control the smart device and the robotics to automatically insert an audio cable 2060 into the headset/microphone jack of the smart device. In one embodiment, an audio cable can be plugged into the audio jack of the smart device automatically using commands sent from the system controller to a servo on the smart plate or custom holder.

At step 2110, a reference audio file is placed on the smart device using the system controller. At step 2112, the audio device 2050 is controlled using the system controller to start recording.

At step 2114, the smart device is controlled to play the reference audio file. Subsequently, at step 2116, the recording is stopped and the captured audio file is retrieved from the audio device 2050 and digitized.

At step 2118, the retrieved audio file is compared with the reference audio file stored in the system controller memory to determine if the device passed or failed the test. In one embodiment, the POLQA library can be used to perform the file comparison and determine a pass/fail condition.

At step 2120, the audio cable is removed from the smart device using a servo or actuator on the custom holder on the smart plate under the control of the system controller.

Figure 22:
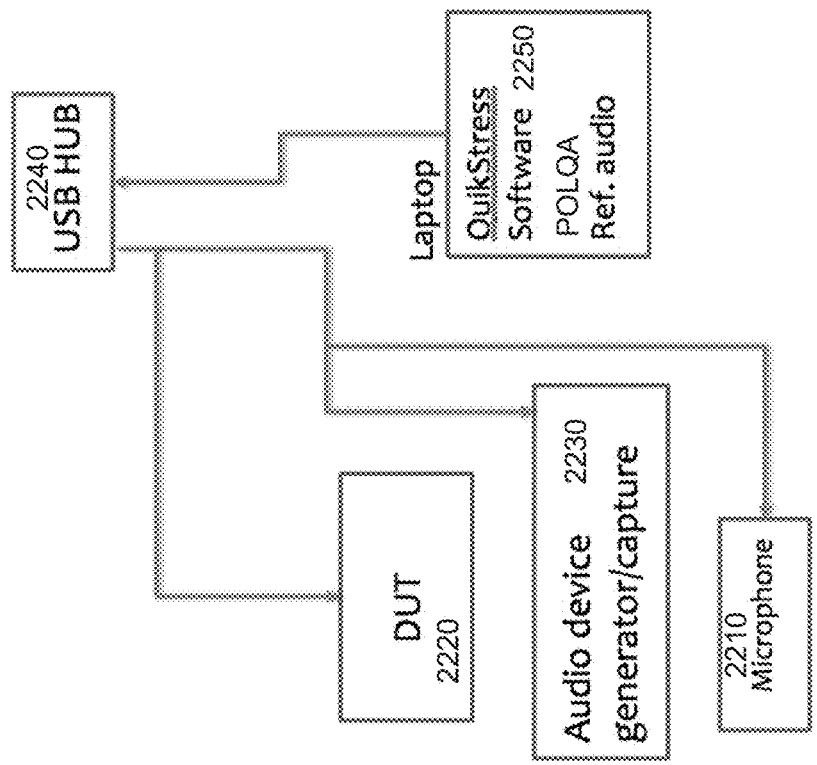
FIG. 22 is a functional block diagram illustrating a system for testing the phone call functionality of the smart device using the Smart Box in accordance with an embodiment of the present invention.

FIG. 22 is a functional block diagram illustrating a system for testing the phone call functionality of the smart device using the Smart Box in accordance with an embodiment of the present invention. As shown in FIG. 22 the system controller 2250 comprises a software package (e.g., Quikstress) that can communicate with and control the smart device under test (DUT 2220), the audio device 2230, and the microphone 2210 through the USB hub 2240 in the Smart Box.

Figure 23:
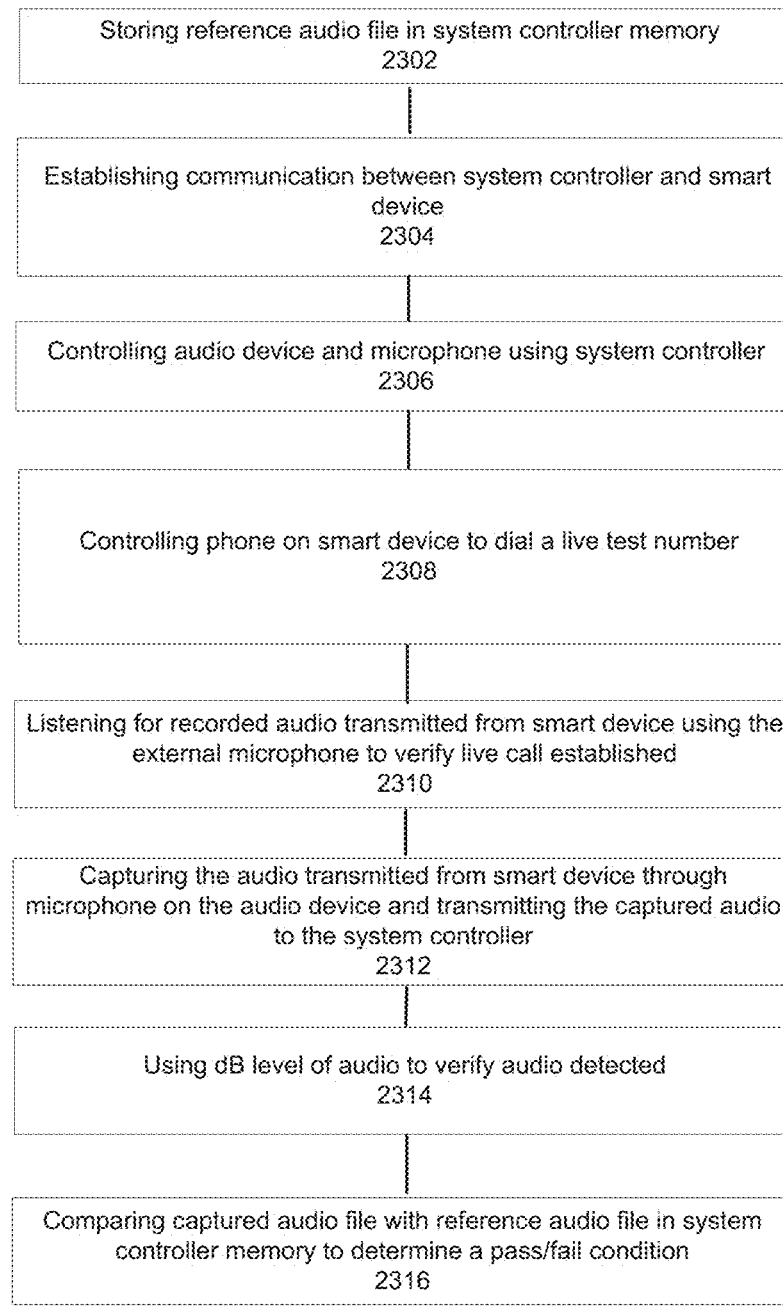
FIG. 23 depicts a flowchart of another exemplary computer controlled process of testing the live phone call making capability of a smart device using the Smart Box in accordance with an embodiment of the present invention.

FIG. 23 depicts a flowchart of another exemplary computer controlled process of testing the live phone call making capability of a smart device using the Smart Box in accordance with an embodiment of the present invention.

At step 2302, a reference audio file is stored or resides in the memory of system controller 2250.

At step 2304, communication is established between the system controller and the smart device 2220. In one embodiment, this communication is performed using USB, Wi-Fi or any other suitable protocol. The communication, in one embodiment, can flow through USB hub 2240.

At step 2306, audio device 2230 and microphone 2210 is controlled using the system controller. At step 2308, the smart device is controlled to dial a live test number.

At step 2310, the external microphone 2210 and audio device 2230 are used to listen for recorded audio transmitted from the smart device to verify that the live call was established.

At step 2312, the audio transmitted from the smart device through the microphone is captured by the audio device 2230 and delivered to the system controller.

At step 2314, the dB level of the audio is used to verify that audio is detected. In one embodiment, POLQA software can be used to verify the audio according to audio POLQA standards.

At step 2316, the retrieved audio file is compared with the reference audio file stored in the system controller memory to determine if the device passed or failed the test. In one embodiment, the POLQA library can be used to perform the file comparison and determine a pass/fail condition.

Figure 24:
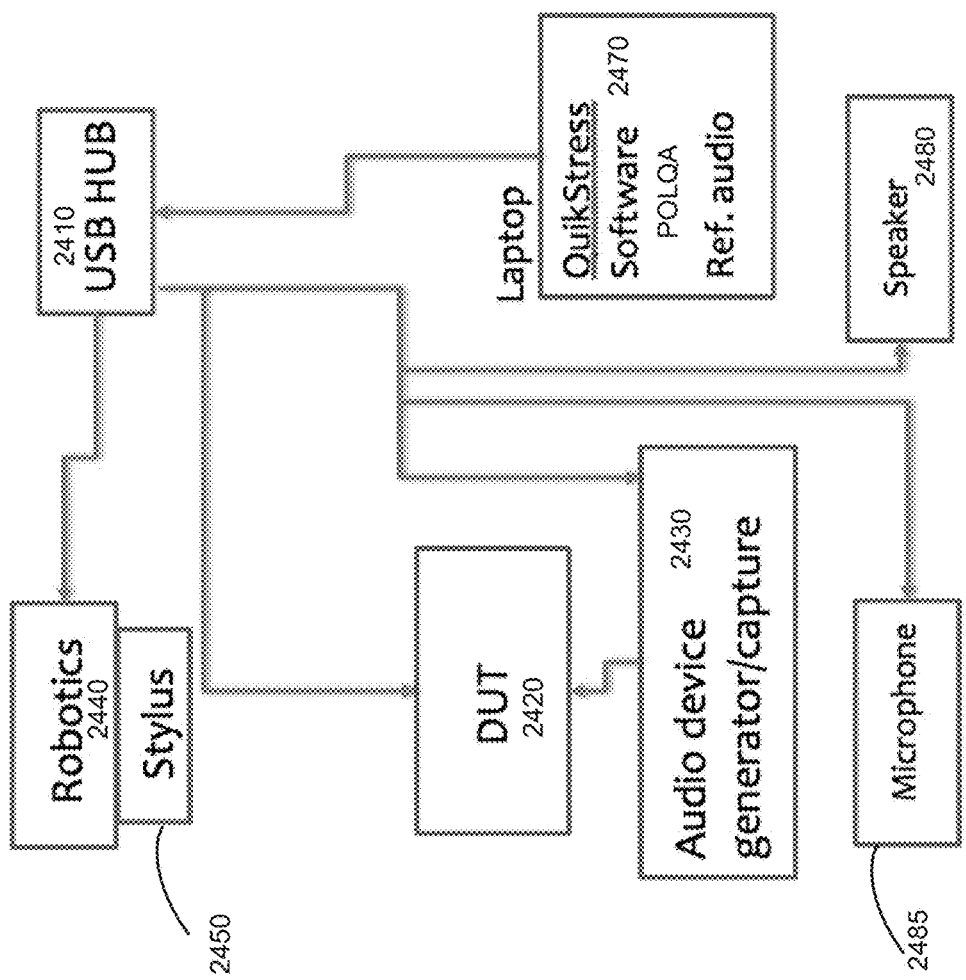
FIG. 24 is a functional block diagram illustrating a system for testing the ability of the smart device to record over the air audio and play it back using the Smart Box in accordance with an embodiment of the present invention.

FIG. 24 is a functional block diagram illustrating a system for testing the ability of the smart device to record over the air audio and play it back using the Smart Box in accordance with an embodiment of the present invention. As shown in FIG. 24 the system controller 2470 comprises a software package (e.g., Quikstress) that can communicate with and control the smart device under test (DUT 2420), the robotics 2440 (e.g., stylus 2450), the audio device 2430, the speaker 2480, and the microphone 2485 through the USB hub 2410 in the Smart Box. In the embodiment illustrated in FIG. 24, the system controller also comprises a reference audio file and the POLQA library (discussed above).

Figure 25:
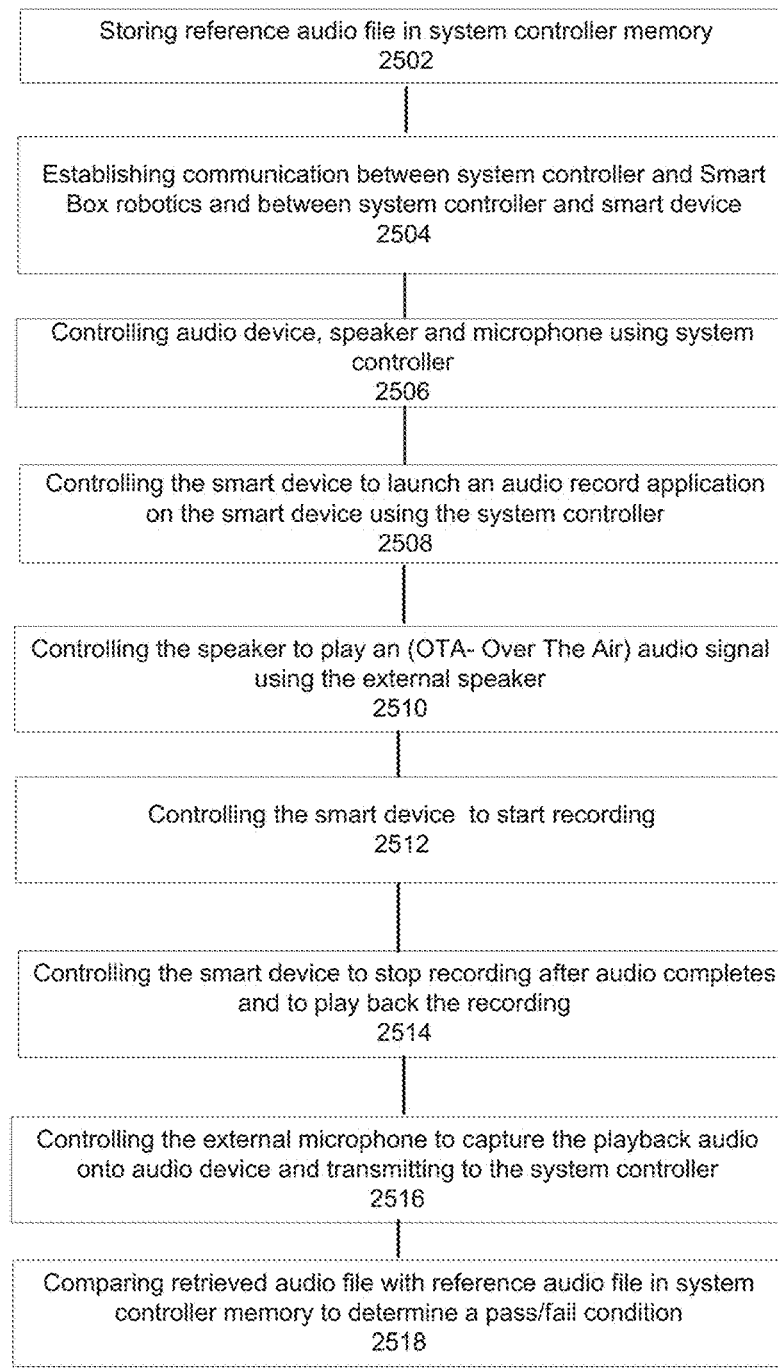
FIG. 25 depicts a flowchart of another exemplary computer controlled process of testing the ability of the smart device to record over the air audio and play it back using the Smart Box in accordance with an embodiment of the present invention.

FIG. 25 depicts a flowchart of another exemplary computer controlled process of testing the the ability of the smart device to record over the air audio and play it back using the Smart Box in accordance with an embodiment of the present invention.

At step 2502, a reference audio file is stored or resides in the memory of system controller 2470.

At step 2504, communication is established between the system controller and the smart device 2420 and between the system controller and the robotics 2440 (e.g., stylus 2450). In one embodiment, this communication is performed using USB, Wi-Fi or any other suitable protocol. The communication, in one embodiment, can flow through USB hub 2410.

At step 2506, audio device 2430, speaker 2480, and microphone 2485 is controlled using the system controller. At step 2508, the smart device is controlled to launch an audio record application on the smart device using the system controller.

At step 2510, the external speaker in the Smart Box is controlled to play an over the air (OTA) audio signal. At step 2512, the smart device is controlled to start recording the audio signal played by the external speaker. At step 2514, the smart device is controlled to stop the recording after the audio completes and to play back the recording.

At step 2516, the external microphone 2485 is controlled to capture the playback audio onto audio device 2430 and transmitting it to the system controller. Finally, at step 2518, the retrieved audio file is compared with the reference audio file stored in the system controller memory to determine if the device passed or failed the test. In one embodiment, the POLQA library can be used to perform the file comparison and determine a pass/fail condition.

Vibration Test

Figure 26:
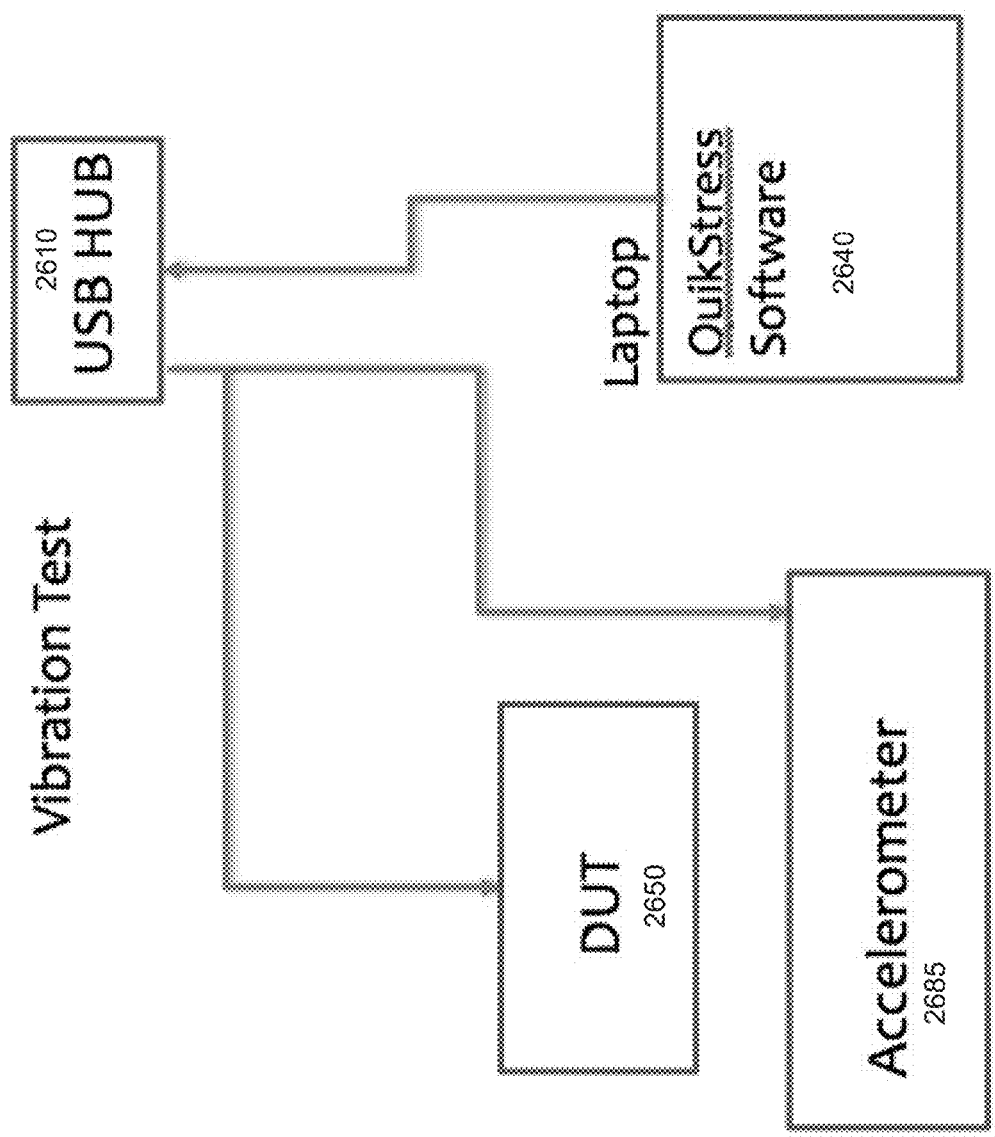
FIG. 26 is a functional block diagram illustrating a system for testing the vibrate functionality of the smart device using the Smart Box in accordance with an embodiment of the present invention.

FIG. 26 is a functional block diagram illustrating a system for testing the vibrate functionality of the smart device using the Smart Box in accordance with an embodiment of the present invention. As shown in FIG. 26, the system controller 2640 comprises a software package (e.g., Quikstress) that can communicate with and control the smart device under test (DUT 2650) and the external accelerometer 2685 in the Smart Box through the USB hub 2610 in the Smart Box.

Figure 27:
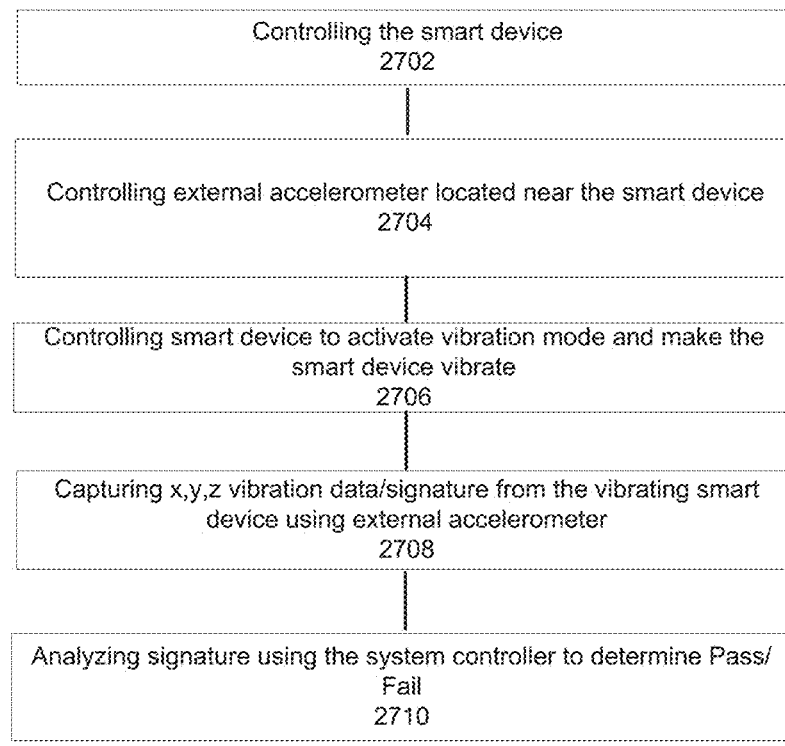
FIG. 27 depicts a flowchart of another exemplary computer controlled process of testing the vibrate functionality of the smart device using the Smart Box in accordance with an embodiment of the present invention.

FIG. 27 depicts a flowchart of another exemplary computer controlled process of testing the vibrate functionality of the smart device using the Smart Box in accordance with an embodiment of the present invention.

At step 2702, the system controller 2640 communicates with and controls the smart device 2650. At step 2704, the external accelerometer 2685 located near the smart device is also controlled using the system controller.

At step 2706, the smart device is controlled to activate vibration mode in order to make the smart device vibrate. At step 2708, the external accelerometer is used to capture the x, y, z vibration data and signature from the vibrating smart device. In one embodiment, the accelerometer can obtain this information from the smart plate on which the smart device rests or from the custom holder into which the smart device fits. This information is transmitted back to the system controller through the USB hub.

At step 2710, the system controller analyzes the signature to determine a pass or fail condition.

The vibration feature of the phone can be tested in other ways in different embodiments. In one embodiment, the smart device's internal accelerometer data can be analyzed during vibration using the system controller. In other words, the smart device could be set on vibrate mode and metadata from the internal accelerometer on the phone while it is vibrating can be used by the system controller to determine if the vibrate feature is functioning adequately.

In a different embodiment, the vibrate mode can also be verified by analyzing the frequency of the vibration using the Smart Box audio testing capabilities. In other words, one of the audio capture devices can capture the sound of the smart device vibrating and the system controller can analyze the sound to determine if the vibrate feature is functioning adequately.

Auto-Brightness Test

Figure 28:
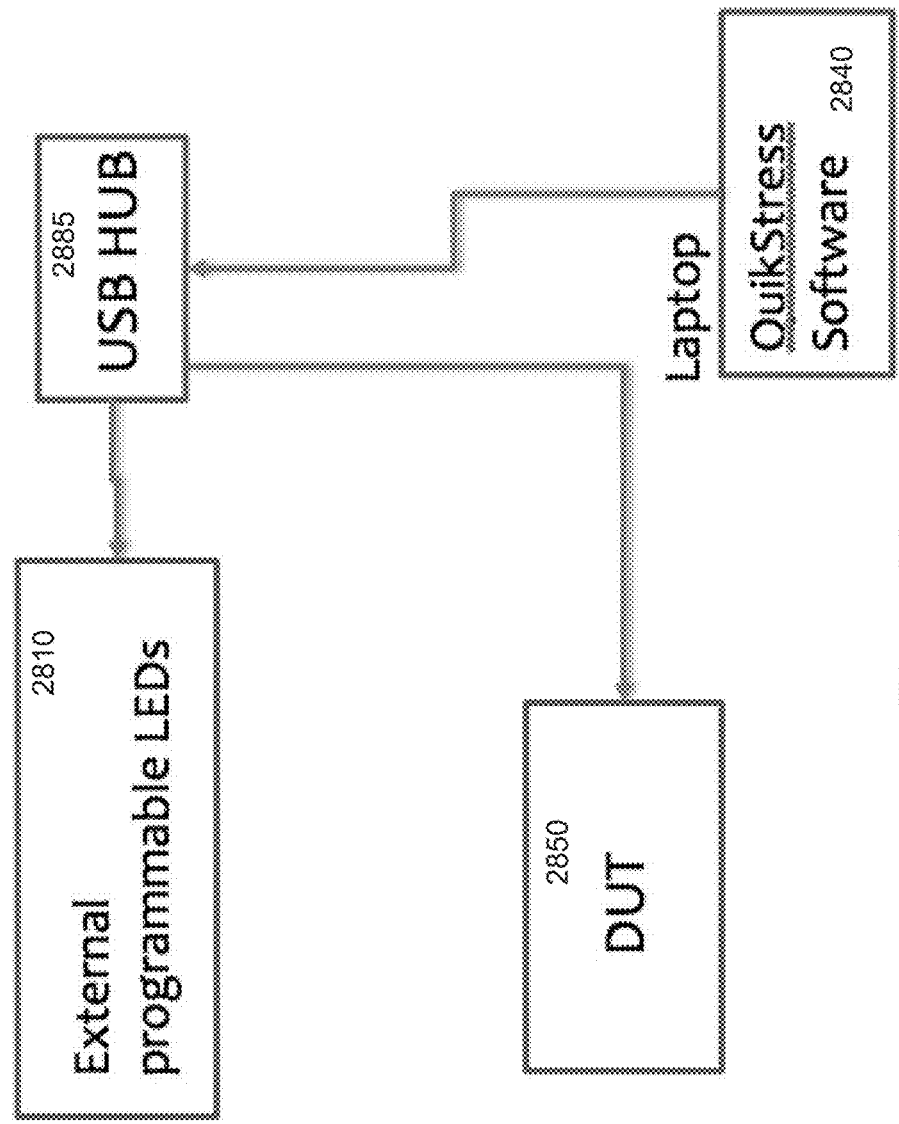
FIG. 28 is a functional block diagram illustrating a system for testing the auto brightness feature of the smart device using the Smart Box in accordance with an embodiment of the present invention.

FIG. 28 is a functional block diagram illustrating a system for testing the auto brightness feature of the smart device using the Smart Box in accordance with an embodiment of the present invention. As shown in FIG. 28, the system controller 2840 comprises a software package (e.g., Quikstress) that can communicate with and control the smart device under test (DUT 2850) and the external programmable LEDs 2810 in the Smart Box through the USB hub 2885 in the Smart Box.

Figure 29:
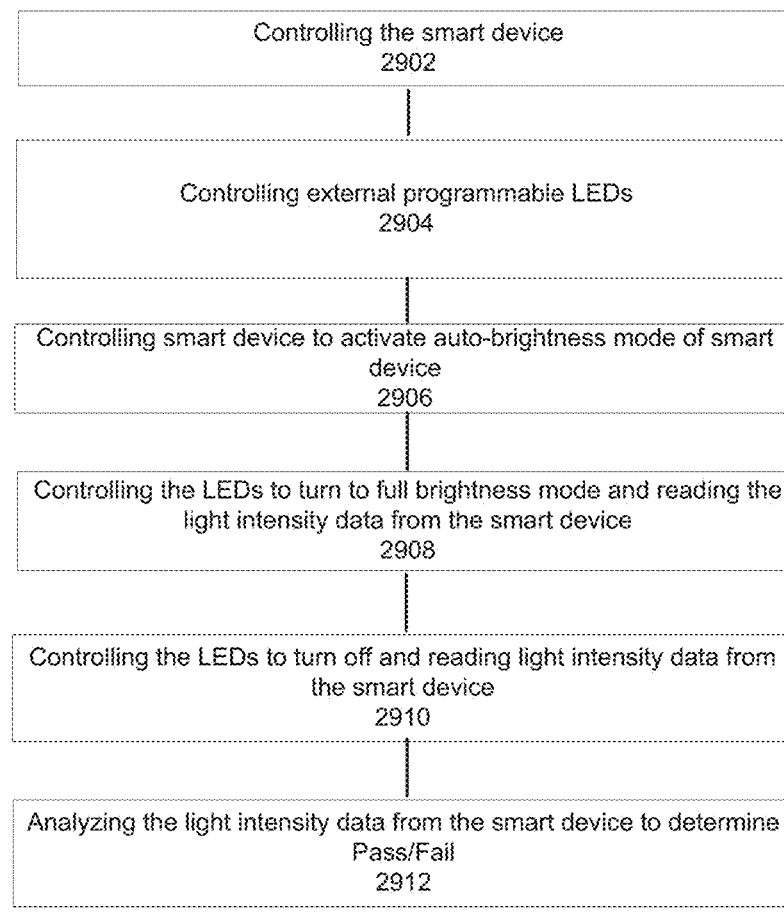
FIG. 29 depicts a flowchart of another exemplary computer controlled process of testing the auto brightness feature of the smart device using the Smart Box in accordance with an embodiment of the present invention.

FIG. 29 depicts a flowchart of another exemplary computer controlled process of testing the auto brightness feature of the smart device using the Smart Box in accordance with an embodiment of the present invention.

At step 2902, the system controller 2840 communicates with and controls the smart device 2850. At step 2904, the external programmable LEDs 2810 is also controlled using the system controller.

At step 2906, the smart device is controlled to activate the auto-brightness mode on the smart device. At step 2908, the LEDs are turned to full brightness and the light intensity data is read from the smart device. At step 2910, the LEDs are turned off by the system controller and the light intensity data is reading using the smart device. At step 2912, the light intensity data is transmitted to the system controller and analyzed to determine a Pass/Fail condition.

In one embodiment, the same methodology as illustrated in FIGS. 28 and 29 can also be used to test the backlight operation of the smart device. Accordingly, the Smart Box can be used to test both the auto-brightness and the LCD backlight of the smart device.

Bluetooth Test

Figure 30:
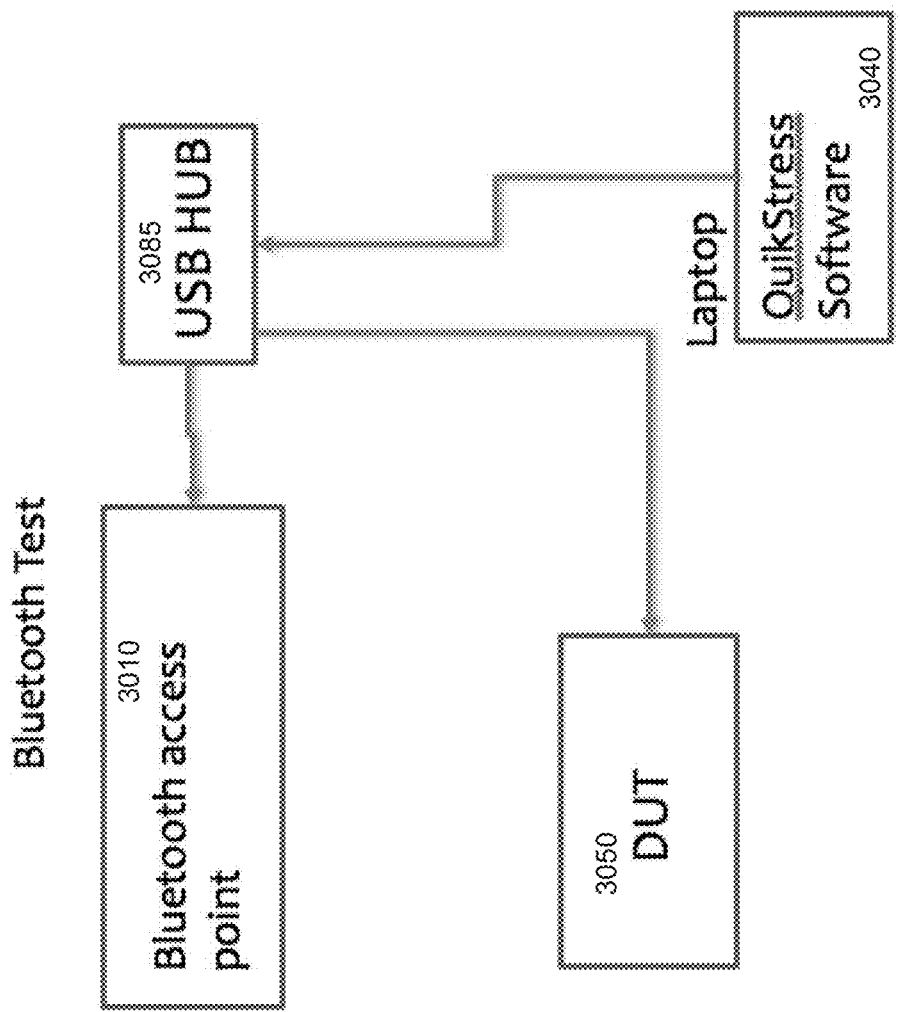
FIG. 30 is a functional block diagram illustrating a system for testing the Bluetooth module of the smart device using the Smart Box in accordance with an embodiment of the present invention.

FIG. 30 is a functional block diagram illustrating a system for testing the Bluetooth module of the smart device using the Smart Box in accordance with an embodiment of the present invention. As shown in FIG. 30, the system controller 3040 comprises a software package (e.g., Quikstress) that can communicate with and control the smart device under test (DUT 3050) and the Bluetooth access point 3010 in the Smart Box through the USB hub 3085 in the Smart Box. In one embodiment, the Bluetooth access point may be affixed to the bottom of the smart plate in the Smart Box to ensure that it is in close proximity to the smart device.

Figure 31:
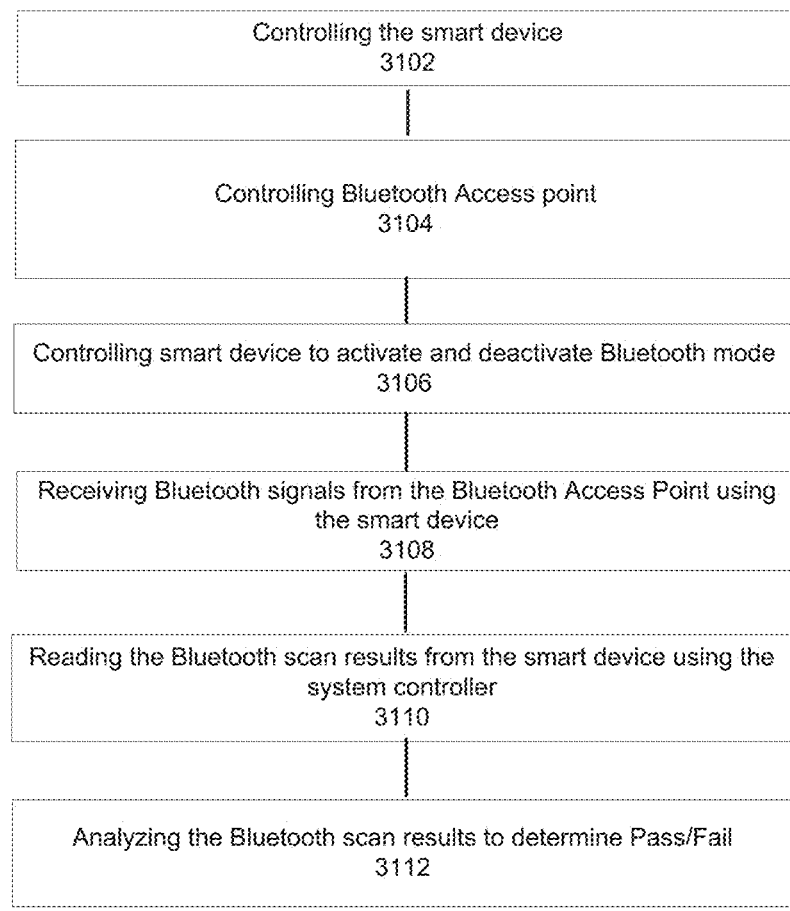
FIG. 31 depicts a flowchart of another exemplary computer controlled process of testing the Bluetooth capability of the smart device using the Smart Box in accordance with an embodiment of the present invention.

FIG. 31 depicts a flowchart of another exemplary process of testing the Bluetooth feature of the smart device using the Smart Box in accordance with an embodiment of the present invention.

At step 3102, the system controller 3040 communicates with and controls the smart device 3050. At step 3104, the Bluetooth Access Point 3010 is also controlled using the system controller.

At step 3106, the smart device is controlled to activate and deactivate the Bluetooth mode. At step 3108, Bluetooth signals are received from the Bluetooth Access point 3010 using the smart device. At step 3110, the Bluetooth scan results are read in by the system controller from the smart device.

At step 3112, the Bluetooth scan results are analyzed by the system controller to determine a Pass/Fail condition.

In one embodiment, a similar methodology to above is also used to test the Near Field Communications (NFC) functionality of the smart device.

Wi-Fi Test

Figure 32:
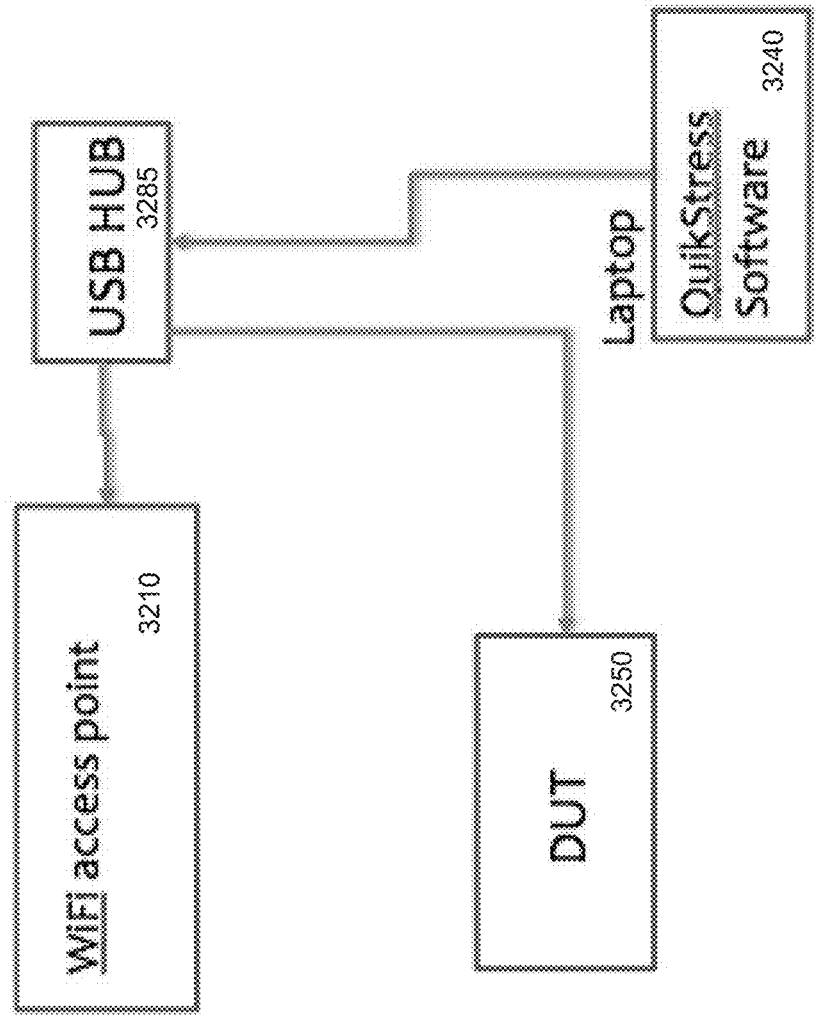
FIG. 32 is a functional block diagram illustrating a system for testing the Wi-Fi capability of the smart device using the Smart Box in accordance with an embodiment of the present invention.

FIG. 32 is a functional block diagram illustrating a system for testing the Wi-Fi capability of the smart device using the Smart Box in accordance with an embodiment of the present invention. As shown in FIG. 32, the system controller 3240 comprises a software package (e.g., Quikstress) that can communicate with and control the smart device under test (DUT 3250) and the Wi-Fi access point 3210 in the Smart Box through the USB hub 3285 in the Smart Box. In one embodiment, the Wi-Fi access point may be affixed to the bottom of the smart plate in the Smart Box to ensure that it is in close proximity to the smart device.

Figure 33:
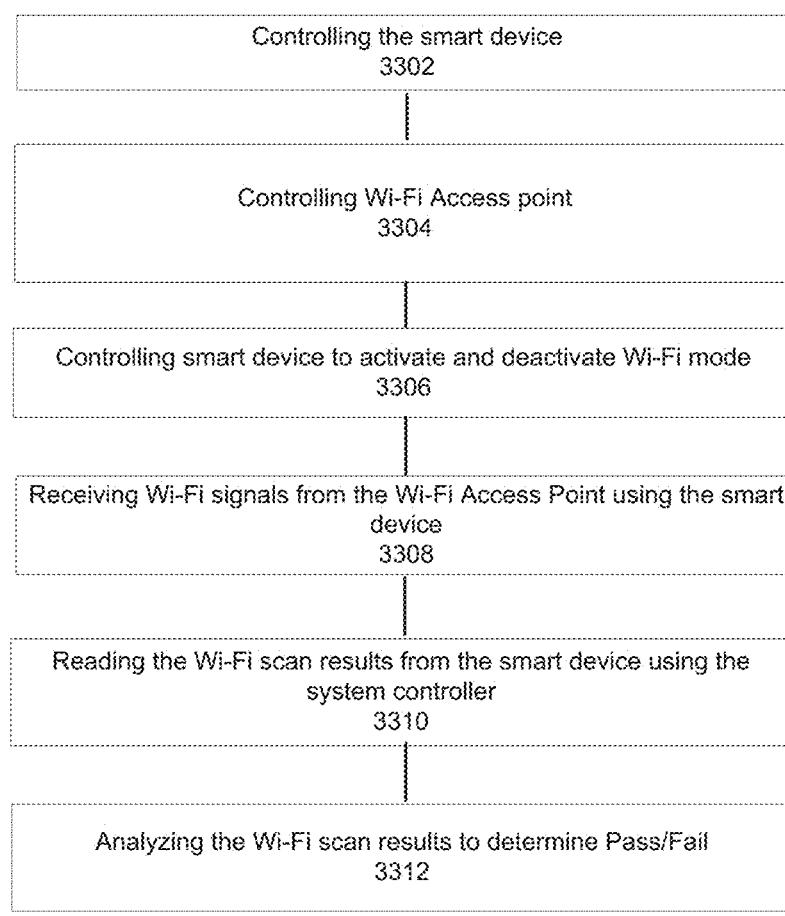
FIG. 33 depicts a flowchart of another exemplary computer controlled process of testing the Wi-Fi capability of the smart device using the Smart Box in accordance with an embodiment of the present invention.

FIG. 33 depicts a flowchart of another exemplary computer controlled process of testing the Wi-Fi capability of the smart device using the Smart Box in accordance with an embodiment of the present invention.

At step 3302, the system controller 3240 communicates with and controls the smart device 3250. At step 3304, the Wi-Fi Access Point 3210 is also controlled using the system controller.

At step 3306, the smart device is controlled to activate and deactivate the Wi-Fi mode. At step 3308, Wi-Fi signals are received from the Wi-Fi Access point 3210 using the smart device. At step 3310, the Wi-Fi scan results are read in by the system controller from the smart device.

At step 3312, the Wi-Fi scan results are analyzed by the system controller to determine a Pass/Fail condition.

GPS Test

Figure 34:
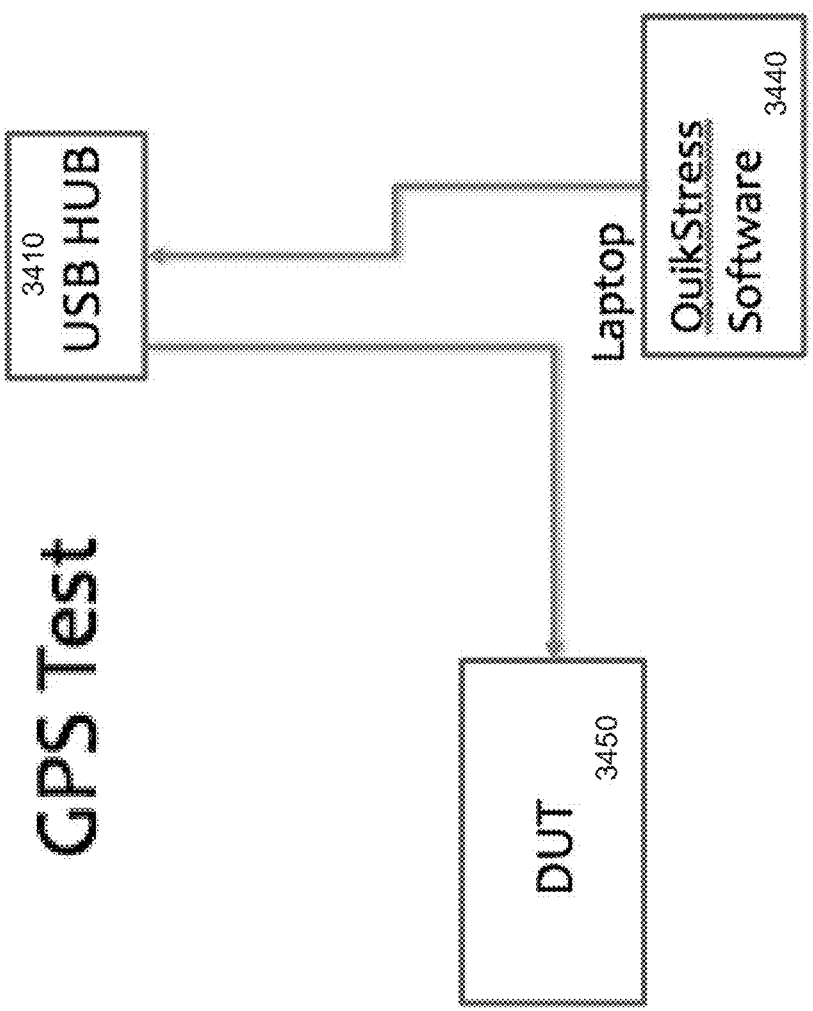
FIG. 34 is a functional block diagram illustrating a system for testing the GPS capability of the smart device using the Smart Box in accordance with an embodiment of the present invention.

FIG. 34 is a functional block diagram illustrating a system for testing the GPS capability of the smart device using the Smart Box in accordance with an embodiment of the present invention. As shown in FIG. 34, the system controller 3440 comprises a software package (e.g., Quikstress) that can communicate with and control the smart device under test (DUT 3450) in the Smart Box through the USB hub 3410 in the Smart Box.

Figure 35:
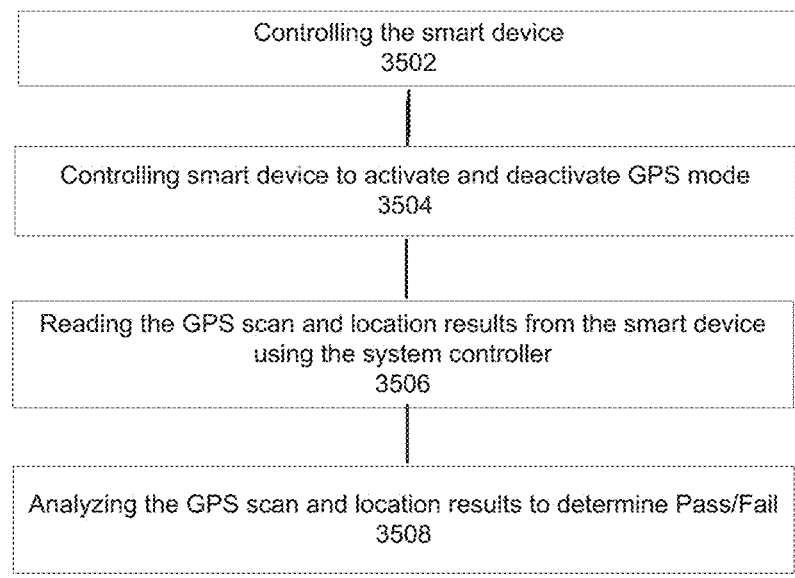
FIG. 35 depicts a flowchart of another exemplary computer controlled process of testing the GPS capability of the smart device using the Smart Box in accordance with an embodiment of the present invention.

FIG. 35 depicts a flowchart of another exemplary computer controlled process of testing the GPS capability of the smart device using the Smart Box in accordance with an embodiment of the present invention.

At step 3502, the system controller 3440 communicates with and controls the smart device 3450. At step 3504, the smart device is controlled to activate and deactivate the GPS mode on the smart device. At step 3506, the GPS and location results are read from the smart device using the system controller. At step 3508, the GPS scan and location results are analyzed by the system controller to determine a Pass/Fail condition.

Other Tests

In different embodiments, the Smart Box can be configured to test various other features of the smart device.

In one embodiment, for example, the Smart Box can be configured to test the gravity sensor on the smart device. Using the x-y-z movement capability of the Smart Box robotics, the smart device can be manipulated up/down, sideways, and rotated to verify the phone's gravity sensor.

In one embodiment, the Smart Box can be configured to test the light sensor on the smart device. Using the Smart Box integrated camera and light source, the light sensor on the smart device can be verified. For example, the light source can be used to activate or deactivate the light sensor on the smart device while the camera can be used to capture images and transmit information to the system controller, wherein the system controller can analyze the images to ensure proper functioning of the smart device.

In one embodiment, the Smart box can be configured to test the proximity sensor on the smart device. Using the x-y-z movement capability of the Smart Box robotics, an object, e.g., the stylus can be brought in close proximity with the smart device. To determine if the proximity sensor is functioning properly, the system controller will test whether the display screen deactivates when the object is brought into close proximity to the screen of the smart device and then re-activates again when the object is moved further away from the screen.

In one embodiment, the Smart Box can be configured to test the smart device's gyroscope sensor. Using the x-y-z movement capability of the Smart Box robotics and the rotation features, the smart device can be manipulated in multiple axes. The system controller can retrieve metadata from the smart device as it is being manipulated to determine the proper functionality of the gyroscope sensor.

In one embodiment, the Smart Box can be configured to test the smart device's compass. Using the x-y-z movement capability of the Smart Box robotics and the rotation features, the smart device can be rotated and the compass output can be monitored by the system controller. The system controller can retrieve metadata from the smart device as it is being rotated to determine the proper functionality of the compass.

As mentioned above, in one embodiment, the Smart Box can be configured to test the various physical buttons on the smart device. For example, either the stylus or another actuator similar to the stylus can be configured to test the smart device's volume up and down buttons, menu buttons, back buttons, and home buttons. The stylus, for example, can be used to depress or activate any physical key on the smart device. The metadata from the operation is communicated to the system controller from the smart device and/or stylus and the system controller determines if the smart device is functioning properly.

In one embodiment, the Smart Box can be configured to test the radio functionality on the smart device. The smart device can be controlled to tune the device FM chip to a station and verify that a radio signal is received. Typically, an FM generator on the production floor can be used to perform this test. The system controller is operable to tune the FM radio on the smart device to a desired frequency. Further, the audio devices in the Smart Box can be configured to capture the output of the smart device and transmit it to the system controller, which verifies that the FM audio signal is detected.

In one embodiment, the Smart Box can be used to determine the battery status and if the smart device is charging properly. For example, the Smart Box can be used to determine if the charging icon appears on the screen when power is plugged in. By way of further example, the Smart Box can also be programmed to determine the amount of charge being held by the battery and the temperature conditions. Further, one of the USB stations in the USB Hub can be configured to monitor power supply current flowing to the smart device. In one embodiment, the Smart Box has current monitoring integrated into the USB cabling that verifies the correct charging amperage being supplied to the phone.

In one embodiment, the Smart Box is operable to determine the SD card slot functionality of the smart device. For example, the Smart Box can be used to determine the ability of the smart device to test the capacity of the SD card, to read and write to the SD card, and to delete files from the SD card. In one embodiment, the Smart Box robotics can be used to automatically insert the SD card into the smart device and the system controller can then control the smart device to either read from or write to the SD card. In one embodiment, the system controller can be configured to verify the SD capacity.

In one embodiment, the system controller can be configured to retrieve all the smart device information when the smart device is plugged into the smart plate. For example, the system controller can be configured to retrieve the IMEI, the model, the make, and other data regarding the smart device when the smart device is plugged in.

In one embodiment, the Smart Box is operable to determine the SIM card functionality of the smart device. For example, the Smart Box robotics in conjunction with the system controller can be used to insert and remove the SIM card from the smart device. Further, the system controller can be used to verify that the smart device reads the SIM card successfully.

In one embodiment, the Smart Box is operable to the test the On The Go (OTG) feature on the smart device. For example, the robotics in the Smart Box may plug the OTG cable into the smart device. The system controller can then be used to verify OTG functionality.

In one embodiment, the Smart Box is operable to test the ROM on the smart device. The system controller can read from and write to the ROM to verify its functionality.

In one embodiment, the Smart Box can be integrated with a wireless charger that can be used to test the wireless charging capability of the smart device. The Smart Box robotics can place the smart device on a wireless charger and the system controller can be used to verify that the smart device is charging.

In one embodiment, the Smart Box can be used to perform fingerprint recognition. The robotic stylus can be integrated with a capacitive touch capability in order to test the fingerprint sensor on the smart device. The system controller can communicate with the stylus and the smart device to verify functionality.

In one embodiment, the Smart Box can be used to test the device pedometer. The Smart Box integrated movement capability (e.g., using the robotics) can be used to manipulate the smart device in a similar way to jogging. The system controller can read the metadata from the smart device and the pedometer to verify functionality.

In one embodiment, the audio generation and capture capabilities of the Smart Box can also be combined with the audio analysis abilities of the system controller (e.g. using QUIKSTRESS and POLQA) to verify the smart device speech recognition capability.

Testing Multiple Devices Simultaneously

Figure 36:
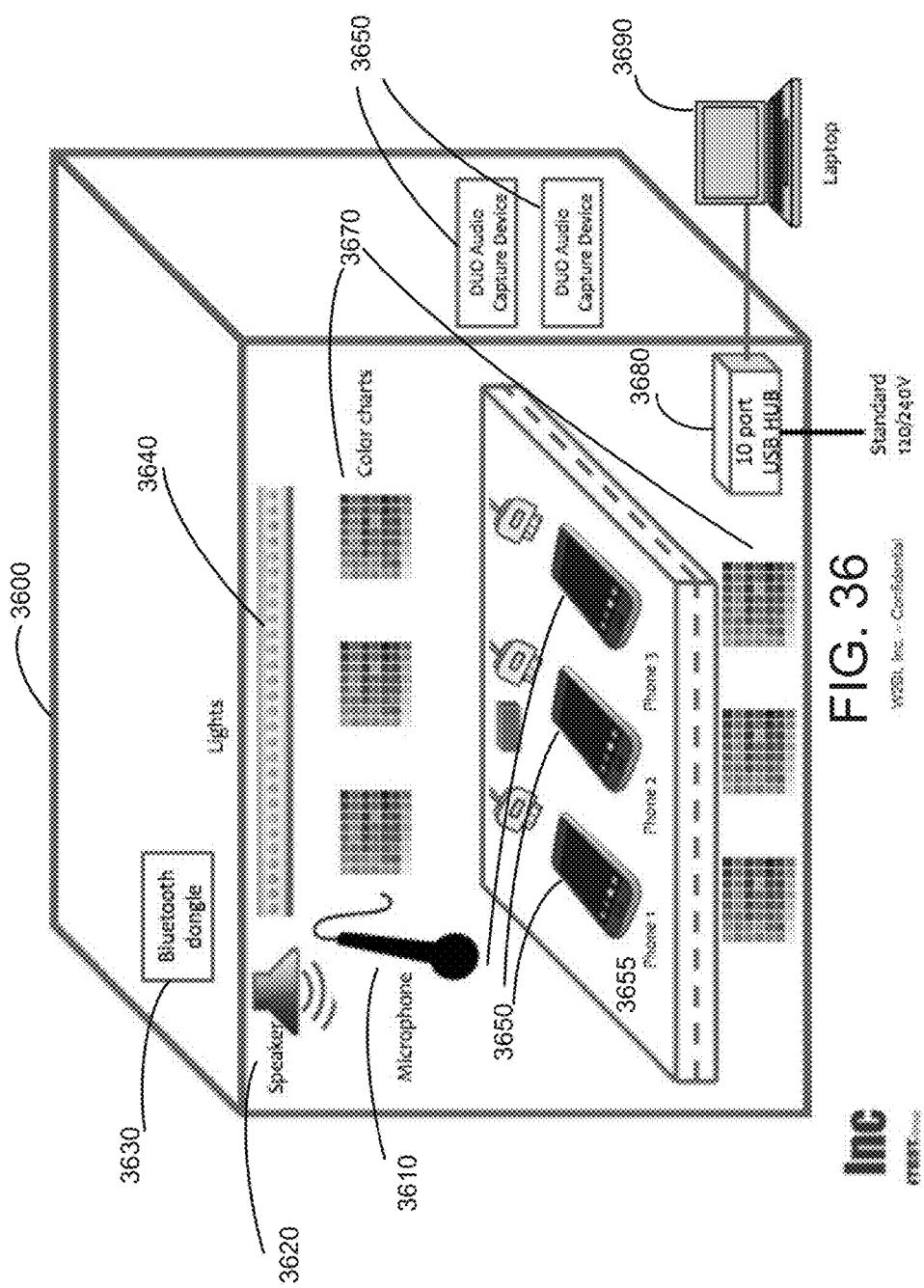
FIG. 36 illustrates the components of a Smart Box capable of testing multiple devices simultaneously in accordance with an embodiment of the present invention.

FIG. 36 illustrates the components of a Smart Box capable of testing multiple devices simultaneously in accordance with an embodiment of the present invention.

In the embodiment illustrated in FIG. 36, multiple smart devices 3650 can be tested within the Smart Box 3600. An operator can quickly insert as many as three smart devices in the embodiment illustrated in FIG. 36, test them, and swap them out with three new smart devices using the smart device carrier shown in FIG. 37 below. In the embodiment illustrated in FIG. 36, each smart device has its own set of corresponding image plates 3670 fixed in the Smart Box. In one embodiment, each image plate comprises images of color charts as mentioned above.

Further, as discussed above, the Smart Box 3600 can also comprise an external speaker 3620, a Bluetooth Access point 3630, a microphone 3610, a LED light strip 3640, audio generating and capturing devices 3650, and a USB Hub 3680 that communicates with a system controller, e.g., laptop 3690. Laptop 3690 can run test automation software, e.g., QUIKSTRESS that can be used to control the smart devices and the components within the Smart Box 3600. In one embodiment, smart plate 3655 can be equipped with multiple custom phone holders into which the devices can be inserted for testing. In a different embodiment, a phone holder design such as the one illustrated in FIG. 37 may be used.

Figure 37:
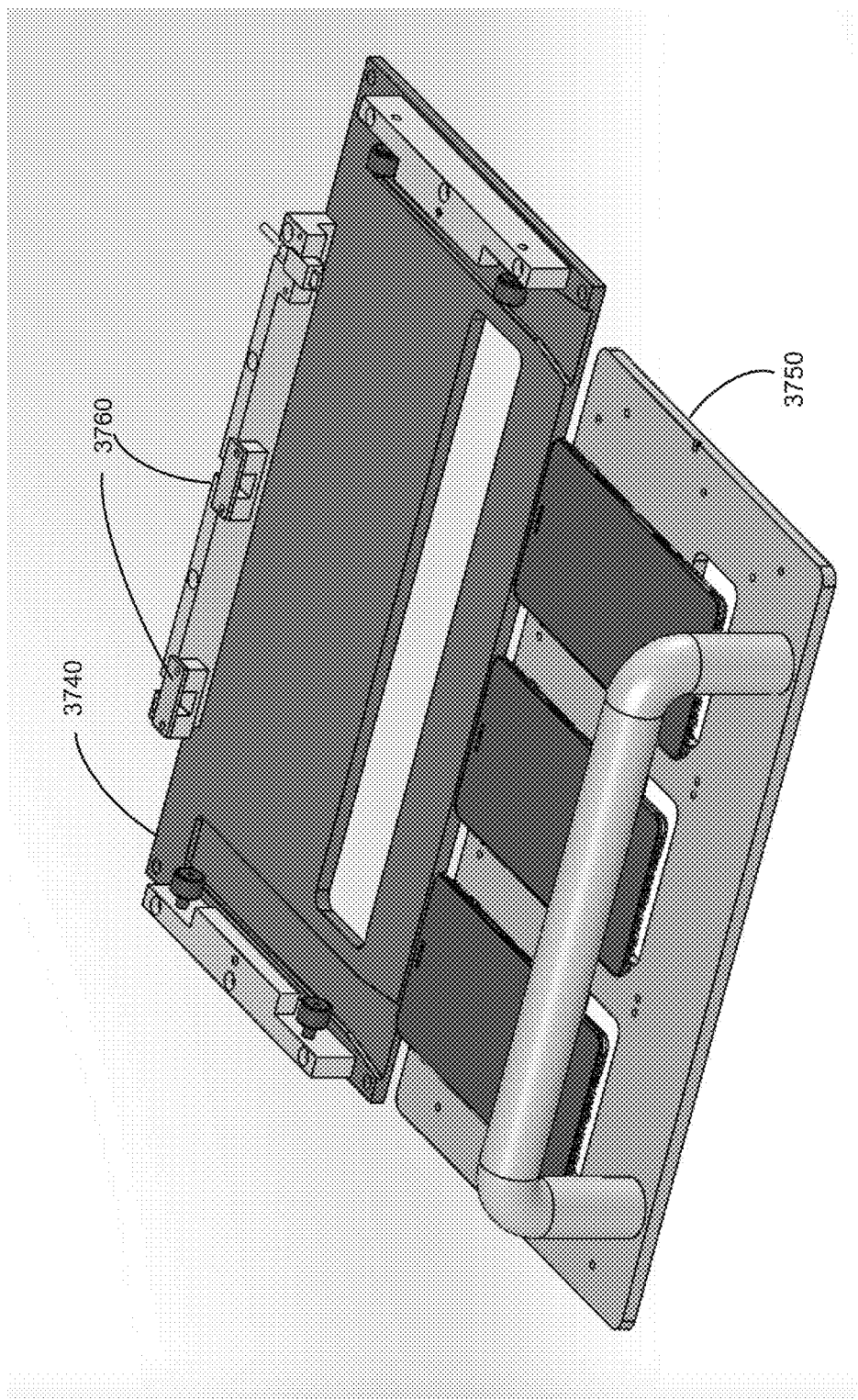
FIG. 37 illustrates a carrier into which multiple phones can be loaded for testing using the apparatus of FIG. 36 in accordance with an embodiment of the present invention.

FIG. 37 illustrates a smart plate carrier into which multiple phones can be loaded for testing using the apparatus of FIG. 36 in accordance with an embodiment of the present invention. As mentioned above, the design illustrated in FIG. 36 facilitates an operator quickly inserting as many as three smart devices in the carrier illustrated in FIG. 36, testing them, and swapping them out with three new smart devices.

In one embodiment, the multiple phones can be inserted or fitted into a daughter carrier 3750. The daughter carrier slides in and out of the mother carrier 3740. The operator can typically pre-load the multiple phones onto the daughter carrier, slide it into the mother carrier, which in turn makes the USB connections using USB ports 3760. The operator can then activate the system controller to run the tests on the smart devices at the click of a button. While the smart devices are being tested, the operator is then free to pre-load another daughter carrier and also prepare it for testing. Accordingly, this embodiment allows several phones to be tested in an efficient and speedy fashion.

Running Diagnostics Using Smart Box

FIG. 38 illustrates the manner in which the Smart Box facilitates device diagnostics at a point of sale in accordance with an embodiment of the present invention. As mentioned above, currently if a user experiences a problem with their phone and brings it into a retail facility, there are no systems in place to exhaustively test the hardware and software on the phone to determine the source of the problem with a high degree of accuracy. Using embodiments of the present invention, a technician or sales clerk at the retail facility can simply insert the smart device into Smart Box 3840. The system controller 3850 (e.g., laptop, desktop, tablet device etc.) connected to the Smart Box 3840 can then be used to select one or more diagnostic tests 3860 to be run on the smart device using automation software running on the system controller 3850. In one embodiment, test automation software, e.g., QUIKSTRESS can be used to stress the smart device in a variety of ways in order to ensure correct functionality of the smart device. Using the test automation software, fully automated tests can be executed with conclusive and actionable results.

Figure 39:
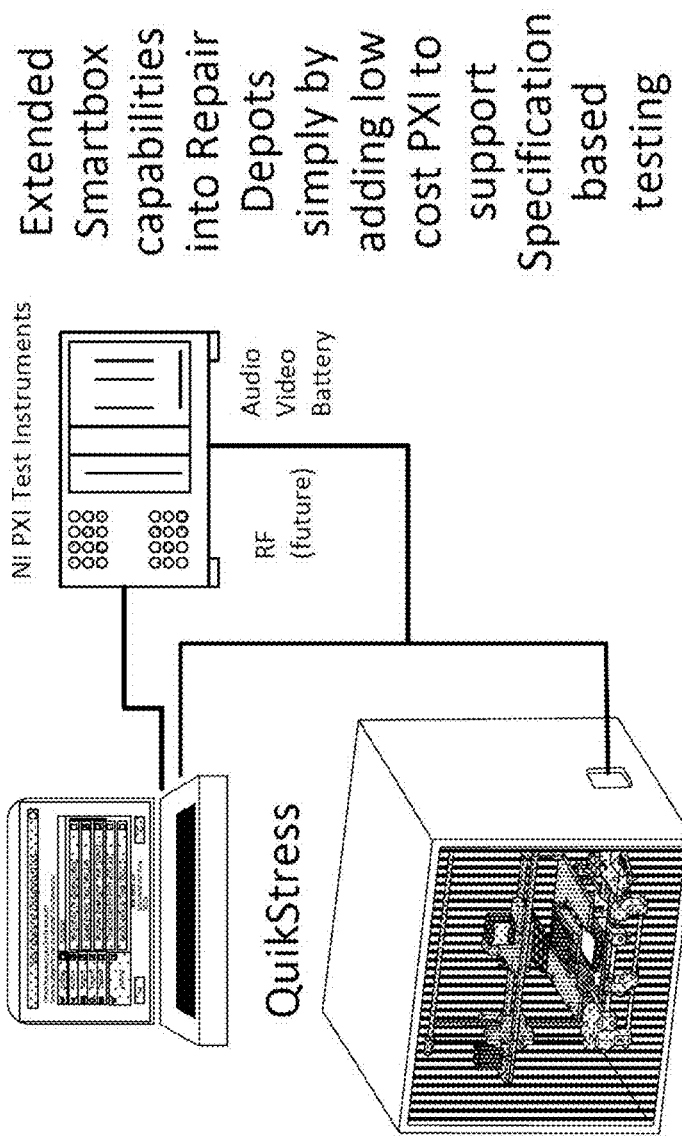
FIG. 39 illustrates expanded test capabilities of the Smart Box in accordance with an embodiment of the present invention.

FIG. 39 illustrates expanded test capabilities of the Smart Box in accordance with an embodiment of the present invention. As shown in FIG. 39, in one embodiment, the Smart Box can be used to conduct both functional and specification tests, e.g., RF, audio, video and power tests. In the embodiment shown in FIG. 39, for example, the Smart Box capabilities can be extended into repair depots simply by adding low cost PXI to support specification based testing. PXI is a rugged PC-based platform for measurement and automation systems as is well-known in the test automation industry.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. An automatic system level testing (ASLT) system for testing smart devices, said system comprising:
   a system controller operable to be coupled to a smart device, wherein the system controller comprises a memory comprising test logic and a processor;
   an enclosure comprising a plurality of components, the plurality of components comprising:
   a robotic arm comprising a stylus, wherein the robotic arm and the stylus are operable to actuate buttons on a screen of the smart device;
   a platform comprising a device holder, wherein the device holder is operable to hold the smart device inserted therein; and
   a wireless access point, wherein the wireless access point is configured to transmit wireless signals for performing a test selected from the group consisting of: a Bluetooth test, a Wi-Fi test, a Near Field Communication (NFC) test and a wireless charge test;
   and wherein the processor is configured to automatically control the smart device and the plurality of components in accordance with the test logic, and wherein the processor is further configured to:
      control the smart device to activate a wireless mode therein by actuating a button associated with the wireless mode on the screen of the smart device using the robotic arm and the stylus;
      receive wireless signals from the wireless access point using the smart device;
      retrieve wireless scan results from the smart device; and
      analyze the wireless scan results to determine wireless functionality for the smart device.

2. The system of claim 1, wherein the wireless access point is a Bluetooth Access point, the wireless mode is a Bluetooth mode, and the wireless signals are Bluetooth signals.

3. The system of claim 1, wherein the wireless access point is a Wi-Fi access point, the wireless mode is a Wi-Fi mode, and the wireless signals are Wi-Fi signals.

4. The system of claim 1, wherein the wireless access point is a Near Field Communication (NFC) access point, the wireless mode is a NFC mode, and the wireless signals are Near Field Communication signals.

5. The system of claim 1, wherein the wireless access point is a wireless charging station, the wireless mode is a wireless charging mode, and the wireless signals are wireless charge signals.

6. The system of claim 1, wherein the processor is further configured to:
retrieve metadata from a plurality of sensors on said smart device; and
transmit the metadata to the system controller.

7. The system of claim 6, wherein metadata is retrieved from a gravity sensor of the smart device while the platform is operable to be rotated in the x-z plane and the y-z plane, and wherein the processor is further configured to analyze the metadata to determine functionality of the gravity sensor of the smart device.

8. The system of claim 6, wherein metadata is retrieved from a gyroscope sensor of the smart device while the platform is rotated in the x-z plane and the y-z plane, and wherein the processor is further configured to analyze the metadata to determine functionality of the gyroscope sensor of the smart device.

9. The system of claim 6, wherein metadata is retrieved from a compass of the smart device while the platform is rotated in the x-z plane and the y-z plane, and wherein the processor is further configured to analyze the metadata to determine functionality of the compass of the smart device.

10. The system of claim 6, wherein metadata is retrieved from an accelerometer of the smart device while the platform is rotated in the x-z plane and the y-z plane, and wherein the processor is further configured to analyze the metadata to determine functionality of the accelerometer of the smart device.

11. The system of claim 6, wherein the robotic arm is operable to move in a z direction.

12. The system of claim 11, wherein metadata is retrieved from a proximity sensor of the smart device while the stylus is moved in the z direction in proximity to a touch screen of the smart device, and wherein the processor is further configured to analyze the metadata to determine functionality of the proximity sensor of the smart device.

13. The system of claim 6, wherein metadata is retrieved from a pedometer of the smart device, wherein the processor is further configured to:
control the platform to manipulate the smart device to simulate a walking motion; and
and analyze the metadata to determine functionality of the pedometer of the smart device.

14. The system of claim 6, wherein the plurality of components further comprises an external accelerometer.

15. The system of claim 14, wherein the processor is further configured to:
control the smart device to activate a vibration mode;
capture a vibration related data and signature from the smart device using the external accelerometer; and
analyze the vibration related data and signature from the smart device to determine proper functionality of the smart device.

16. The system of claim 1, wherein the enclosure further comprises an external programmable LED, and wherein the processor is further configured to:
control the smart device to activate an auto-brightness mode;
control the external programmable LED to turn to full brightness mode; and
analyze light intensity metadata from the smart device responsive to the brightness mode.

17. The system of claim 16, wherein the processor is further configured to:
control the external programmable LED to turn off; and
analyze a light intensity metadata from the smart device to determine proper functionality of the auto-brightness mode.

18. The system of claim 17, wherein the plurality of components further comprises an external camera.

19. The system of claim 18, wherein the processor is further configured to:
control the external programmable LED to a full brightness mode;
control the external camera to capture an image of a display of the smart device; and
analyze metadata from the external camera to determine proper functionality of a light sensor of the smart device.

20. The system of claim 19, wherein the processor is further configured to:
control the external programmable LED to turn off;
control the external camera to capture an image of the display of the smart device; and
analyze metadata from the external camera to determine proper functionality of the light sensor of the smart device.

21. The system of claim 1, wherein the processor is further configured to:
control the smart device to activate GPS mode;
receiving GPS and location results from the smart device; and
analyzing the GPS and location results received from the smart device to determine GPS functionality for the smart device.

22. An automatic system level testing (ASLT) apparatus for testing smart devices, said apparatus comprising:
a system controller operable to be coupled to a smart device, wherein the system controller comprises a memory comprising test logic and a processor;
an enclosure comprising a plurality of components, the plurality of components comprising:
a robotic arm comprising a stylus;
a platform comprising a device holder, wherein the device holder is operable to hold the smart device inserted therein; and
a wireless access point, wherein the wireless access point is configured to transmit wireless signals for performing a test selected from the group consisting of: a Bluetooth test, a Wi-Fi test, a Near Field Communication (NFC) test and a wireless charge test;
and wherein the processor is configured to automatically control the smart device and the plurality of components in accordance with the test logic, and wherein the processor is further configured to:
control the smart device to activate a wireless mode therein using the robotic arm and the stylus, wherein the stylus is operable to interact with a touch screen of the smart device to activate the wireless mode;

receive wireless signals from the wireless access point using the smart device;

retrieve wireless scan results from the smart device; and analyze the wireless scan results to determine wireless functionality for the smart device.

\* \* \* \* \*